(12) United States Patent
Mains, Jr.

(10) Patent No.: US 11,775,892 B2
(45) Date of Patent: * Oct. 3, 2023

(54) APPARATUS AND METHOD FOR FREIGHT DELIVERY AND PICK-UP

(71) Applicant: CRC R&D, LLC, Kenner, LA (US)

(72) Inventor: Ronald H. Mains, Jr., Kenner, LA (US)

(73) Assignee: CRC R&D, LLC, Kenner, LA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/790,300

(22) Filed: Jul. 2, 2015

(65) Prior Publication Data

US 2015/0356481 A1 Dec. 10, 2015

Related U.S. Application Data

(63) Continuation-in-part of application No. 14/506,545, filed on Oct. 3, 2014, now Pat. No. 11,625,664.

(Continued)

(51) Int. Cl.
*G06Q 10/0631* (2023.01)
*G06Q 10/083* (2023.01)
(Continued)

(52) U.S. Cl.
CPC ....... *G06Q 10/06311* (2013.01); *G06Q 10/06* (2013.01); *G06Q 10/08* (2013.01);
(Continued)

(58) Field of Classification Search
USPC ..................................................... 705/7.13
See application file for complete search history.

(56) References Cited

U.S. PATENT DOCUMENTS

| 4,093,084 A | 6/1978 | Ringer |
| 5,666,493 A | 9/1997 | Wojcik et al. |

(Continued)

FOREIGN PATENT DOCUMENTS

| CN | 109344825 A | 2/2019 |
| WO | 2006084255 | 8/2006 |
| WO | 2006124105 A2 | 11/2006 |

OTHER PUBLICATIONS

Nicola Zingirian, Sensor Clouds for Intelligent Truck Monitoring, Jun. 3-7, 2012, Intelligent Vehicles Symposium, 999-1004 (Year: 2012).*

(Continued)

*Primary Examiner* — Timothy Padot
*Assistant Examiner* — Allison M Neal
(74) *Attorney, Agent, or Firm* — Jason P. Mueller; FisherBroyles, LLP

(57) ABSTRACT

An exemplary non-limiting embodiment of the present invention provides a system that includes a loading/unloading facility, a user apparatus having a user interface configured to communicate with a driver of a delivery/pick-up vehicle, and an administrator apparatus configured to communicate with the user apparatus and the loading/unloading facility. The user apparatus is located remotely from the loading/unloading facility. The driver checks into the user apparatus and the administrator apparatus coordinates arrival of the delivery/pick-up vehicle at the loading/unloading facility.

30 Claims, 15 Drawing Sheets

Related U.S. Application Data

(60) Provisional application No. 61/886,447, filed on Oct. 3, 2013.

(51) Int. Cl.
| | |
|---|---|
| *G06Q 50/28* | (2012.01) |
| *G06Q 10/08* | (2023.01) |
| *G06Q 10/10* | (2023.01) |
| *G06Q 50/30* | (2012.01) |
| *G06Q 10/06* | (2023.01) |

(52) U.S. Cl.
CPC ........... *G06Q 10/083* (2013.01); *G06Q 10/10* (2013.01); *G06Q 50/28* (2013.01); *G06Q 50/30* (2013.01)

(56) References Cited

U.S. PATENT DOCUMENTS

| | | | |
|---|---|---|---|
| 5,712,789 | A | 1/1998 | Radican |
| 5,726,984 | A | 3/1998 | Kubler et al. |
| 5,880,958 | A | 3/1999 | Helms et al. |
| 6,148,291 | A | 11/2000 | Radican |
| 6,421,606 | B1 | 7/2002 | Asai et al. |
| 6,556,138 | B1 | 4/2003 | Sliva et al. |
| 6,577,921 | B1 | 6/2003 | Carson |
| 6,611,755 | B1 | 8/2003 | Coffee et al. |
| 6,687,609 | B2 | 2/2004 | Hsiao et al. |
| 6,795,823 | B1 | 9/2004 | Aklepi et al. |
| 7,049,979 | B2 | 5/2006 | Dunning |
| 7,246,009 | B2 | 7/2007 | Hamblen et al. |
| 7,265,668 | B1 | 9/2007 | Brosius |
| 7,312,702 | B1 | 12/2007 | Willms et al. |
| 7,319,414 | B2 | 1/2008 | Horstemeyer |
| 7,376,600 | B1 | 5/2008 | Wadawadigi et al. |
| 7,603,285 | B2 | 10/2009 | Jacobs et al. |
| 7,827,051 | B2 | 11/2010 | Sanchez et al. |
| 7,973,641 | B1 | 7/2011 | Huang |
| 8,065,205 | B2 | 11/2011 | Naghshiineh et al. |
| 8,219,503 | B2 | 7/2012 | Takahashi et al. |
| 8,279,067 | B2 | 10/2012 | Berger et al. |
| 8,285,611 | B2 | 10/2012 | Fuller et al. |
| 8,311,905 | B1 | 11/2012 | Campbell et al. |
| 8,954,189 | B2 | 2/2015 | Zimmerman et al. |
| 8,959,036 | B2 | 2/2015 | Huat |
| 8,996,287 | B1 | 3/2015 | Davidson |
| 9,208,626 | B2 | 12/2015 | Davidson |
| 9,367,827 | B1 | 6/2016 | Lively |
| 9,743,239 | B1 | 8/2017 | Mishra |
| 9,911,084 | B2 | 3/2018 | Bryson |
| 9,955,298 | B1 | 4/2018 | Haney |
| 10,019,878 | B2 | 7/2018 | Mains, Jr. |
| 10,127,556 | B2 * | 11/2018 | Lesesky ............... G07C 5/085 |
| 10,147,059 | B2 | 12/2018 | Sullivan |
| 10,157,337 | B1 | 12/2018 | Kantor |
| 10,169,993 | B1 | 1/2019 | Dance et al. |
| 10,217,078 | B1 | 2/2019 | Klein |
| 10,242,273 | B1 | 3/2019 | Eckman |
| 10,293,842 | B2 | 5/2019 | Miyajima |
| 10,388,162 | B2 | 8/2019 | De Moura |
| 10,494,205 | B1 | 12/2019 | Hoofard |
| 10,528,900 | B2 | 1/2020 | Jones |
| 10,706,322 | B1 | 7/2020 | Shuo |
| 10,769,947 | B2 | 9/2020 | De Moura |
| 10,990,109 | B2 | 4/2021 | Nelson |
| 2002/0059075 | A1 * | 5/2002 | Schick .................. G06Q 10/06 705/305 |
| 2002/0138580 | A1 | 9/2002 | Al-Kazily |
| 2003/0063000 | A1 | 4/2003 | Grimm |
| 2003/0132298 | A1 | 7/2003 | Swartz et al. |
| 2003/0135304 | A1 | 7/2003 | Sroub et al. |
| 2003/0163227 | A1 | 8/2003 | Yanai |
| 2004/0155778 | A1 | 8/2004 | Shek et al. |
| 2004/0193466 | A1 | 9/2004 | Kull et al. |
| 2004/0260470 | A1 | 12/2004 | Rast |
| 2005/0046584 | A1 | 3/2005 | Breed |
| 2005/0071247 | A1 | 3/2005 | Kelley et al. |
| 2005/0116833 | A1 | 6/2005 | Miller |
| 2005/0128059 | A1 * | 6/2005 | Vause ..................... B60D 1/36 340/431 |
| 2005/0154626 | A1 | 7/2005 | Jones |
| 2005/0171692 | A1 | 8/2005 | Hamblen et al. |
| 2005/0174258 | A1 | 8/2005 | Yamanouchi et al. |
| 2005/0231365 | A1 | 10/2005 | Tester et al. |
| 2006/0095331 | A1 | 5/2006 | O'Malley et al. |
| 2006/0109106 | A1 | 5/2006 | Braun |
| 2006/0208169 | A1 | 9/2006 | Breed et al. |
| 2006/0219776 | A1 | 10/2006 | Finn |
| 2006/0235739 | A1 | 10/2006 | Levis et al. |
| 2006/0251498 | A1 | 11/2006 | Buzzoni et al. |
| 2007/0025832 | A1 * | 2/2007 | Rawdon ................. B64D 9/00 414/401 |
| 2007/0038353 | A1 * | 2/2007 | Larschan ............... G07C 5/085 701/33.4 |
| 2007/0083600 | A1 | 4/2007 | Bakos |
| 2007/0193834 | A1 | 8/2007 | Pai et al. |
| 2008/0055263 | A1 | 3/2008 | Lemay et al. |
| 2008/0163231 | A1 | 7/2008 | Breen et al. |
| 2008/0228514 | A1 | 9/2008 | Robinson et al. |
| 2009/0032510 | A1 | 2/2009 | Ando et al. |
| 2009/0045924 | A1 | 2/2009 | Roberts, Sr. et al. |
| 2009/0265223 | A1 | 10/2009 | Takahashi et al. |
| 2009/0322510 | A1 | 12/2009 | Berger et al. |
| 2010/0069035 | A1 | 3/2010 | Johnson |
| 2010/0088127 | A1 | 4/2010 | Betancourt |
| 2010/0104392 | A1 | 4/2010 | Bowen et al. |
| 2010/0157061 | A1 | 6/2010 | Katsman et al. |
| 2010/0287025 | A1 | 11/2010 | Fletcher et al. |
| 2011/0046775 | A1 | 2/2011 | Bailey |
| 2011/0128143 | A1 | 6/2011 | Daniel |
| 2011/0133888 | A1 | 6/2011 | Stevens et al. |
| 2011/0133932 | A1 | 6/2011 | Tan et al. |
| 2011/0153190 | A1 | 6/2011 | Rolinski et al. |
| 2011/0313893 | A1 | 12/2011 | Wiek, III |
| 2012/0002045 | A1 | 1/2012 | Tony |
| 2012/0126939 | A1 | 5/2012 | Chang |
| 2012/0146763 | A1 | 6/2012 | Teti et al. |
| 2012/0190386 | A1 | 7/2012 | Anderson |
| 2012/0191272 | A1 * | 7/2012 | Andersen ................. B66F 9/24 705/28 |
| 2012/0246039 | A1 | 9/2012 | Fain et al. |
| 2012/0310520 | A1 | 12/2012 | Kanno et al. |
| 2013/0016636 | A1 | 1/2013 | Berger et al. |
| 2013/0173287 | A1 | 7/2013 | Cashman et al. |
| 2013/0226632 | A1 | 8/2013 | Gilbert et al. |
| 2014/0006302 | A1 * | 1/2014 | McQuillan ........... G06Q 10/083 705/337 |
| 2014/0035723 | A1 * | 2/2014 | Alfar ....................... G05B 1/01 340/5.65 |
| 2014/0052327 | A1 | 2/2014 | Hosein et al. |
| 2014/0067313 | A1 | 3/2014 | Breed |
| 2014/0074257 | A1 | 3/2014 | Bhargava |
| 2014/0095240 | A1 | 4/2014 | White et al. |
| 2014/0114718 | A1 * | 4/2014 | Randall ................. G06Q 10/08 705/7.23 |
| 2014/0156524 | A1 * | 6/2014 | Ruud ................. G06Q 20/3224 705/42 |
| 2014/0218218 | A1 | 8/2014 | Lloreda et al. |
| 2014/0229399 | A1 * | 8/2014 | Ranganathan ....... G06Q 10/083 705/337 |
| 2014/0279294 | A1 | 9/2014 | Field-Darragh et al. |
| 2014/0306833 | A1 | 10/2014 | Ricci |
| 2014/0309789 | A1 | 10/2014 | Ricci |
| 2014/0309920 | A1 | 10/2014 | Ricci |
| 2015/0006430 | A1 | 1/2015 | Ben-Alexander |
| 2015/0019277 | A1 | 1/2015 | Kostival et al. |
| 2015/0046229 | A1 | 2/2015 | Göllü |
| 2015/0046363 | A1 | 2/2015 | McNamara et al. |
| 2015/0051941 | A1 | 2/2015 | Bell |
| 2015/0066561 | A1 | 3/2015 | Wills et al. |
| 2015/0081582 | A1 | 3/2015 | Mains, Jr. |
| 2015/0278759 | A1 | 10/2015 | Harris |
| 2015/0294431 | A1 | 10/2015 | Fiorucci et al. |

(56) References Cited

U.S. PATENT DOCUMENTS

| | | |
|---|---|---|
| 2015/0347984 A1 | 12/2015 | Sheykh-Zade |
| 2016/0012385 A9 | 1/2016 | Mains, Jr. |
| 2016/0086391 A1 | 3/2016 | Ricci |
| 2016/0104111 A1 | 4/2016 | Jones |
| 2016/0171328 A1* | 6/2016 | Bulan ................ G06V 30/1473 382/321 |
| 2016/0171521 A1 | 6/2016 | Ramirez |
| 2016/0210591 A1 | 7/2016 | Lafrance |
| 2016/0358033 A1 | 12/2016 | Herrera et al. |
| 2017/0043967 A1* | 2/2017 | Walford ............... B65G 69/003 |
| 2017/0124378 A1 | 5/2017 | High |
| 2017/0132541 A1 | 5/2017 | Myers |
| 2017/0185956 A1 | 6/2017 | Göllü |
| 2017/0316379 A1 | 11/2017 | Lepek |
| 2017/0316690 A1 | 11/2017 | Charles |
| 2017/0372262 A1 | 12/2017 | Haney |
| 2018/0018620 A1 | 1/2018 | Göllü |
| 2018/0158340 A1 | 6/2018 | De Moura |
| 2018/0211534 A1 | 7/2018 | De Moura |
| 2018/0268379 A1 | 9/2018 | Collins |
| 2018/0293527 A1 | 10/2018 | Amirjalayer |
| 2018/0305876 A1 | 10/2018 | Langford |
| 2018/0341904 A1 | 11/2018 | Aleman |
| 2018/0374040 A1 | 12/2018 | Hunt |
| 2019/0026690 A1 | 1/2019 | Wappler |
| 2019/0034873 A1 | 1/2019 | Boitel |
| 2019/0035274 A1 | 1/2019 | Sabagh |
| 2019/0062055 A1 | 2/2019 | Hance |
| 2019/0064835 A1 | 2/2019 | Hoofard et al. |
| 2019/0066033 A1 | 2/2019 | Mains, Jr. |
| 2019/0066035 A1 | 2/2019 | Hance |
| 2019/0066041 A1 | 2/2019 | Hance et al. |
| 2019/0087777 A1 | 3/2019 | Turner |
| 2019/0130351 A1 | 5/2019 | Arena |
| 2019/0132714 A1 | 5/2019 | Arena |
| 2019/0286143 A1 | 9/2019 | Ross |
| 2019/0287066 A1 | 9/2019 | Kellaway, Jr. et al. |
| 2019/0378087 A1 | 12/2019 | Easter et al. |

OTHER PUBLICATIONS

Christian Dannegger, Springer Handbook of Automation—Real-Time Autonomic Automation, 2009, Springer Link, pp. 381-404 (Year: 2009).*

"Savings accrue from on-line from truck screening" https://www.itsinternational.com/sections/cost-benefit-analysis/features/savings-accrue-from-on-line-from-truck-screening/, last accessed on Jan. 7, 2020.

Braun, "Everything you need to know about buying a Dock Appointment Schedule System", White Paper: A Practical Guide, C3 Solutions, May 2017.

Braun, "Understanding dock schedule: A guide to better understanding the value of automated dock scheduling", White Paper, C3 Solutions, Mar. 2015.

Bulan et al., "Segmentation- and Annotation-Free License Plate Recognition with Deep Localization and Failure Identification", IEEE Transaction on Intelligent Transportation Systems, 2015, pp. 1-13, DOI: 10.1109/TITS.2016.2639020.

Descartes.com, "Descartes Dock Appointment Scheduling Software", info@descartes.com. May 2016, Retrieved from Archive.org Apr. 7, 2020 (Year: 2016).

Distribution Center Management, "Managing people, materials and costs in the warehouse or DC", Alexander Communications Group, Inc., 2009, www.DistributionGroup.com.

Dubin, "Delivery Scheduling Relieves Loading Dock Bottlenecks", InboundLogistics.com, Jun. 20, 2013, https://www.inboundlogistics.com/cms/article/delivery-scheduling-relieves-loading-dock-bottlenecks/.

Hill et al., "A decision support system for improved resource planning and truck routing at logistic nodes", Inf Technol Manag (2017) 18:241-251, DOI 10.1007/s10799-016-0267-3.

Mongelluzzo, "LA-LB ports repurposing land to aid truckers", JOC.com, Aug. 22, 2017, pp. 1-8.

Salvini et al., Oracle Yard Management Process Guide, Release 12.2, Oracle, Sep. 2015.

Oracle Yard Management, "Extending the Oracle Value Chain Execution Solution", Oracle, 2016.

"Big Bend Travel Plaza: Driver Services", published by wwww.bigbendtravelplaza.com on Jan. 8, 2011 (Year: 2011).

"Hotel internet services", published by www.hotelwifi.com, in 2012 (Year: 2012).

USPS Yard Management System—VOA Manual WhereNet, Accenture, Apr. 23, 2012 (Year: 2012).

C3 Yard datasheet C3 Solutions, Inc., 2016 (Year: 2016).

C3 Solutions Case Study—UK Parcel Delivery Company C3 Solutions, Inc. 2016 (Year: 2016).

The Synchronized Distribution Supply Chain—Best Practices in Yard Management Motorola, 2013 (Year: 2013).

Yard Smart—datasheet C3 Solutions Inc., 2013 (Year: 2013).

4SIGHT helps facilities capitalize on productivity using real-time data Plant Engineering, Jan. 18, 2011 (Year: 2011).

Bulan et al., "Segmentation- and Annotation-Free License Plate Recognition With Deep Localization and Failure Identification", IEEE Transactions on Intelligent Transportation Systems, vol. 18, No. 9, pp. 2351-2363, Sep. 1, 2017 (Jan. 9, 2017).

Braun, Gregory, A Practical Guide—Everything you need to know about buying a Dock Appointment Scheduling System C3 Solutions, May 2017 (Year: 2017).

ITS international "Savings accrue form on-line from truck screening" dated Dec. 8, 2013, all pages (Year: 2013).

Smart Card Alliance, "authentication mechanisms for physical access control", published by Smart Card Alliance on Oct. 2009, all pages. (Year: 2009).

Theodore Kuklinski, "The Use of ID reader-Authentication Secure Access control and credentialing", published by IEEE in 2009, all pages (Year: 2009).

Li, H., P. Wang, and C. Shen. "Towards end-to-end car license plates detection and recognition with deep neural networks. CoRR abs/1709.08828 (2017).".

* cited by examiner

APPARATUS AND METHOD FOR FREIGHT DELIVERY AND PICK-UP

CROSS-REFERENCE TO RELATED APPLICATIONS

The present application is a continuation-in-part of U.S. patent application Ser. No. 14/506,545, filed Oct. 3, 2014, which claims the benefit of U.S. Provisional Patent Application No. 61/886,447, filed on Oct. 3, 2013, both of which are incorporated herein in their entirety by reference thereto.

FIELD

The present invention relates to freight delivery/pick-up systems, and in particular, though non-limiting embodiments, to apparatuses, systems and methods for management of freight vehicles from remote locations.

BACKGROUND

A constant challenge for an entity operating a warehouse, or other delivery and/or pick-up facility, is to efficiently, safely and securely provide for the delivery and pick-up of goods. "Pick-ups" typically involve bringing a freight vehicle to a warehouse loading bay for loading cargo. "Deliveries" typically involve bringing a loaded freight vehicle to a warehouse loading bay for unloading cargo. Freight vehicles are often relatively large tractor/trailers that require ample space, and pick-ups/deliveries are often scheduled for a fixed fifteen to thirty minute window. Theoretically, during the scheduled window, the inbound freight vehicle, e.g., tractor/trailer, arrives, reports to the guard shack or receiving window, is assigned a loading bay, and then proceeds to the loading bay for loading and/or unloading by warehouse personnel. In certain situations, drivers drive directly to the warehouse or loading bay. Often no prescreening is done to ensure authorization of the driver and load prior to arrival at the warehouse site, loading bay, guard shack, or receiving window.

Furthermore, because travel from a previous destination may involve a journey of hundreds or thousands of miles, it is not uncommon for there to be an early or late arrival at the warehouse. An early or late arriving tractor/trailer may have to wait for many minutes or several hours until its previously scheduled or next available pick-up/delivery window. Scheduling delays may also occur for other reasons, including delays related to warehouse operations, weather, etc. Many facilities, due to high volumes of deliveries and/or limited space availability, frequently experience bottlenecks that result in many logistics issues. Few facilities have sufficient on-site parking available. It is not uncommon for there to be long lines of tractor/trailers either on-site or at the side of a nearby highway or street awaiting the opportunity to pick-up or drop-off cargo. These situations are potentially dangerous, often illegal, and cause problems for other vehicles, businesses and residents in the area.

Accordingly, a need exists for methods, apparatuses, and systems for freight delivery and pickup that reduces scheduling delays and provides prescreening and identity verification.

SUMMARY

In an embodiment of the present disclosure, a system is provided. The system has a user apparatus having a user interface configured to communicate with a driver of a delivery/pick-up vehicle, and an administrator apparatus configured to communicate with the user apparatus and a loading/unloading facility. The user apparatus may be located remotely from the loading/unloading facility and the driver checks into the user apparatus. The administrator apparatus may coordinate arrival of the delivery/pick-up vehicle at the facility.

The user apparatus may obtain from the driver at least one of a check-in time, a pick-up/drop-off time, authorization information, driver identifying information, truck or trailer identifying information, and scale in/weight information. The administrator apparatus may relay to the user apparatus at least one of an assigned loading dock, a loading dock current usage graphic, a pick-up/drop-off time, and an authorized driver release. The system may have a logistics support facility in communication with at least one of the administrator apparatus, user apparatus and facility. The system may have a scale system in communication with at least one of the administrator apparatus, user apparatus and facility. Each of the user apparatus and the administrator apparatus may be in communication with camera systems. The user apparatus may verify driver security information and authorize the driver for delivery at the facility. The administrator apparatus may be located at the loading/unloading facility. The administrator apparatus and user apparatus may be located at a same facility. The administrator apparatus and user apparatus may be located at different facilities.

The system may have a pager system in communication with the driver and the administrator apparatus. The user apparatus may be at least one of a kiosk and a wall mounted display. The user apparatus may include at least one of a card reader, an optical scanner, and a DOT reader. The system may further have an administrator. The administrator may interface with the administrator apparatus, the user apparatus, and the facility, and coordinates the arrival of the vehicle at the facility. The facility may include a sensor to detect the presence of the vehicle at a loading dock located at the facility. The sensor may be in communication with the administrator apparatus. The system may further have a DOT reader used to obtain a machine readable DOT number from an image on the vehicle and pull identifying information of the driver from the DOT number.

In an embodiment of the present disclosure, an apparatus is provided. The apparatus has a user system configured to communicate with a driver of a freight delivery/pick-up vehicle and gather information regarding the driver and a delivery schedule. The user system may be located remotely from a loading/unloading facility and in communication with the facility and an administrator apparatus. The driver may check into the user system and the administrator apparatus coordinates arrival of the vehicle at the facility. The user system may obtain from the driver at least one of a check-in time, a pick-up/drop-off time, authorization information, driver identifying information, truck or trailer identifying information, and scale in/weight information. The administrator apparatus may relay to the user system at least one of an assigned loading dock, a loading dock current usage graphic, a pick-up/drop-off time, and an authorized driver release.

The apparatus may have a pager system, the pager system including a pager in communication with the administrator apparatus. The apparatus may have a camera system in communication with the administrator apparatus. The apparatus may have at least one of an optical scanner and a DOT reader. The apparatus may further include a card reader configured to identify the driver of the vehicle. The user apparatus may verify driver security information and authorizes the driver for delivery at the facility. The card reader may be a magnetic stripe reader or TWIC card reader. The apparatus may have a VoIP intercom system configured for the delivery of audio and multimedia sessions over IP networks. The apparatus may further include a printer located within the apparatus, the printer configured to print relevant documents. The printer may be at least one of a badge printer and a printer configured to print on 8½"×11" paper. The apparatus may have a barcode scanner, the barcode scanner configured to read 1D or 2D barcodes on documents containing identifying information.

In an embodiment of the present disclosure, a method for management of freight pick-up and delivery is provided. The method includes checking a driver of a freight delivery/pick-up vehicle into a user apparatus located remotely from a loading/unloading facility; entering driver information into the user apparatus; communicating the driver information to an administrator apparatus in communication with the loading/unloading facility; communicating loading/unloading information from the loading/unloading facility to the administrator apparatus; and utilizing the driver information and the loading/unloading information to coordinate arrival of the delivery/pick-up vehicle at the loading/unloading facility.

DESCRIPTION

The present disclosure provides apparatuses, systems, and methods for remote or off-site check-in of freight vehicles that eliminate many of the problems with current freight delivery and pick-up. Embodiments include custom apparatuses and software that interface as a system to remotely control the logistics of delivery and pick-up of freight, thereby providing for a more efficient, safe and secure use of loading bays and personnel resources. In a specific embodiment, the system provides a simple remote touch screen interface that allows drivers of freight vehicles to remotely login to the freight management system, become authorized, and coordinate, through the system, efficient delivery and/or pick-up of freight. The check-in service may be full service and efficiently coordinate, by providing all necessary information, for safe delivery of goods. The remote login/user interface may be located separate from the loading/unloading facility and possibly may be remotely located from an administrator system. The administrator system communicates with the driver/remote user apparatus as well as the loading/unloading facility and coordinates and controls the logistics of the delivery/pick-up. Some or all of this process is automated by the system apparatuses and software. The remote user interface may be located at an off-site driver's lounge that is relatively near the loading/unloading facility. This remote location may be designed to accommodate freight vehicles and personnel, including providing adequate parking and other amenities. In certain embodiments, the driver is provided a pager which is used to alert him a few minutes before a loading bay is available. While he waits, the driver may utilize facilities for refueling, showering, food, rest, and relaxation. The present system avoids potentially dangerous situations where trucks are parked in queues along highways and residential streets.

Figure 1:
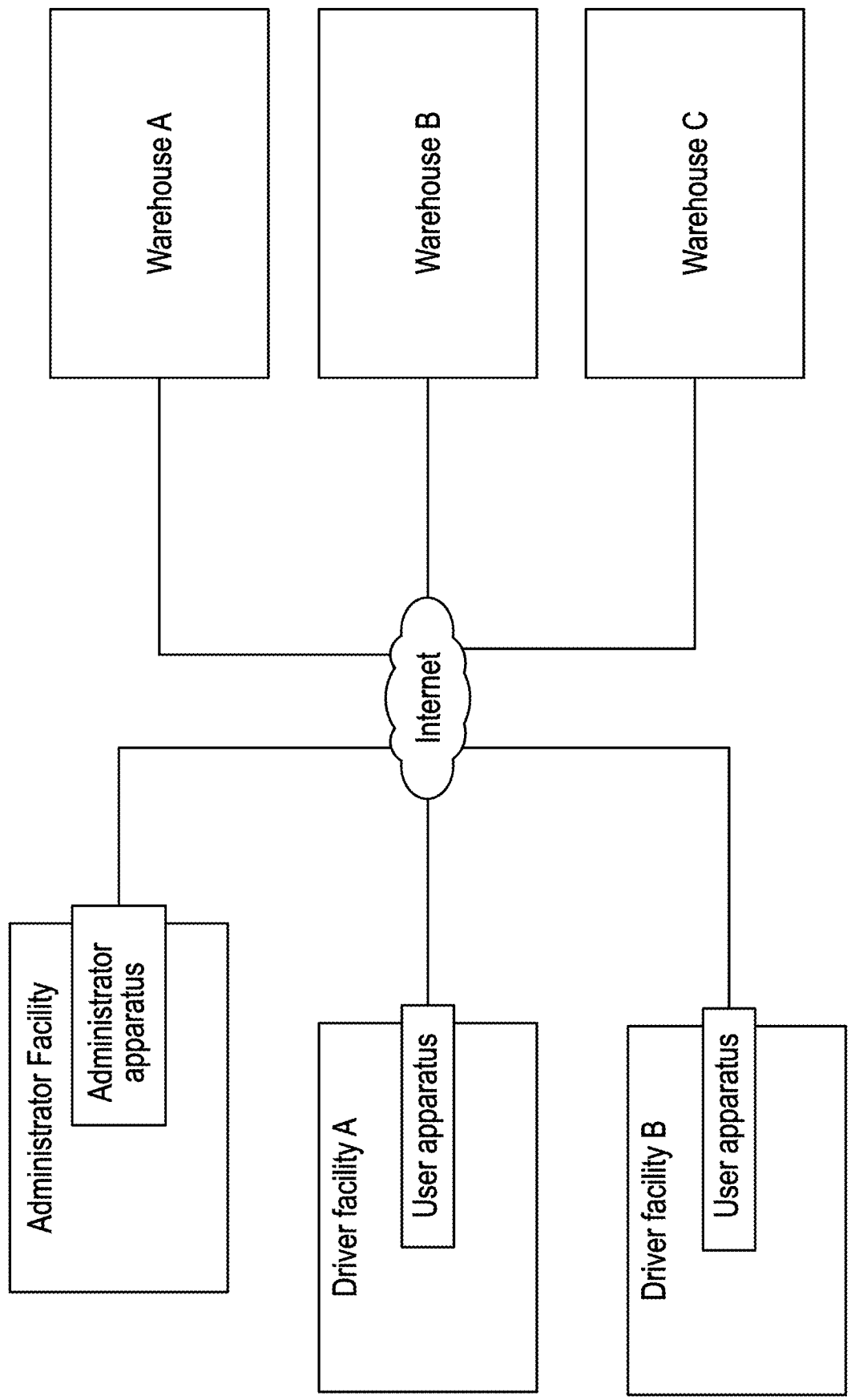
FIG. 1 is a schematic of a freight delivery/pick-up system, according to an exemplary embodiment of the present invention.

FIG. 1 schematically depicts a freight delivery/pick-up system, according to an exemplary embodiment of the present invention. The overall system includes a driver facility, an administrative facility, and a warehouse. As shown in FIG. 1, there are two driver facilities and three warehouse facilities. There may be more or less of each of these facilities. Each driver facility includes a user apparatus. Administrator facility includes an administrator apparatus. Warehouses include unloading/loading facilities such as loading docks. Driver facility is remotely located from the warehouses. Administrative facility may or may not be separately located from the driver facility. User apparatuses, administrator apparatus, and warehouses are all in communication via the Internet. They may, however, be in communication via other communication networks, e.g., a LAN. Administrator system communicates with the driver/remote user apparatus as well as the loading/unloading facility and coordinates and controls the logistics of the delivery/pick-up. Some or all of this process is automated by the system apparatuses and software as described herein.

According to an embodiment of the present invention, a driver of a freight vehicle, e.g., delivery/pick-up vehicle, positions himself at a location distant, e.g. driver facility A, B, from the loading/unloading facility. Driver approaches and communicates with a user interface of a user apparatus. User apparatus and administrator apparatus then work together to coordinate the arrival of the delivery/pick-up vehicle at the loading/unloading facility, e.g. warehouse A, B, C. In further embodiments, the system may include a logistics support facility to further aid in the coordination of arrival of the delivery/pick-up vehicle at the loading/unloading facility. Logistics support facility may be a warehouse or other storage facility or area configured for storing freight until it is ready to be delivered to a final destination such as a specific designated loading/unloading bay. As shown in FIG. 1, the logistics support facility, i.e., warehouse A, B, and/or C, may be in communication with the administrator apparatus, user apparatus and/or loading/unloading facility via the Internet or other suitable network. It may also be tied into a server for the administrator apparatus, user apparatus and/or loading/unloading facility. The system may also include an off-site certified scale system that is in communication with the administrator apparatus, user apparatus and/or loading/unloading facility via the Internet or other suitable network. The scale system may be located in a convenient location such as proximate to the user apparatus and/or driver facility. Alternatively, it may be located at a more remote location.

The loading/unloading facility of the present disclosure can take many forms. In many instances, the loading/unloading facility will be a warehouse with multiple loading docks for delivery/pick-up vehicles. In other cases, the loading/unloading facility could involve ships, train yards, commercial stores, fields or any other structure where efficient scheduling of multiple delivery/pick-up vehicles is advantageous.

Embodiments of the present invention include a check-in driver facility that is remote from or distant from a loading/unloading facility. Check-in driver facility includes a user apparatus that the driver of a freight vehicle checks into and interfaces with the freight management system described herein.

Figure 2:
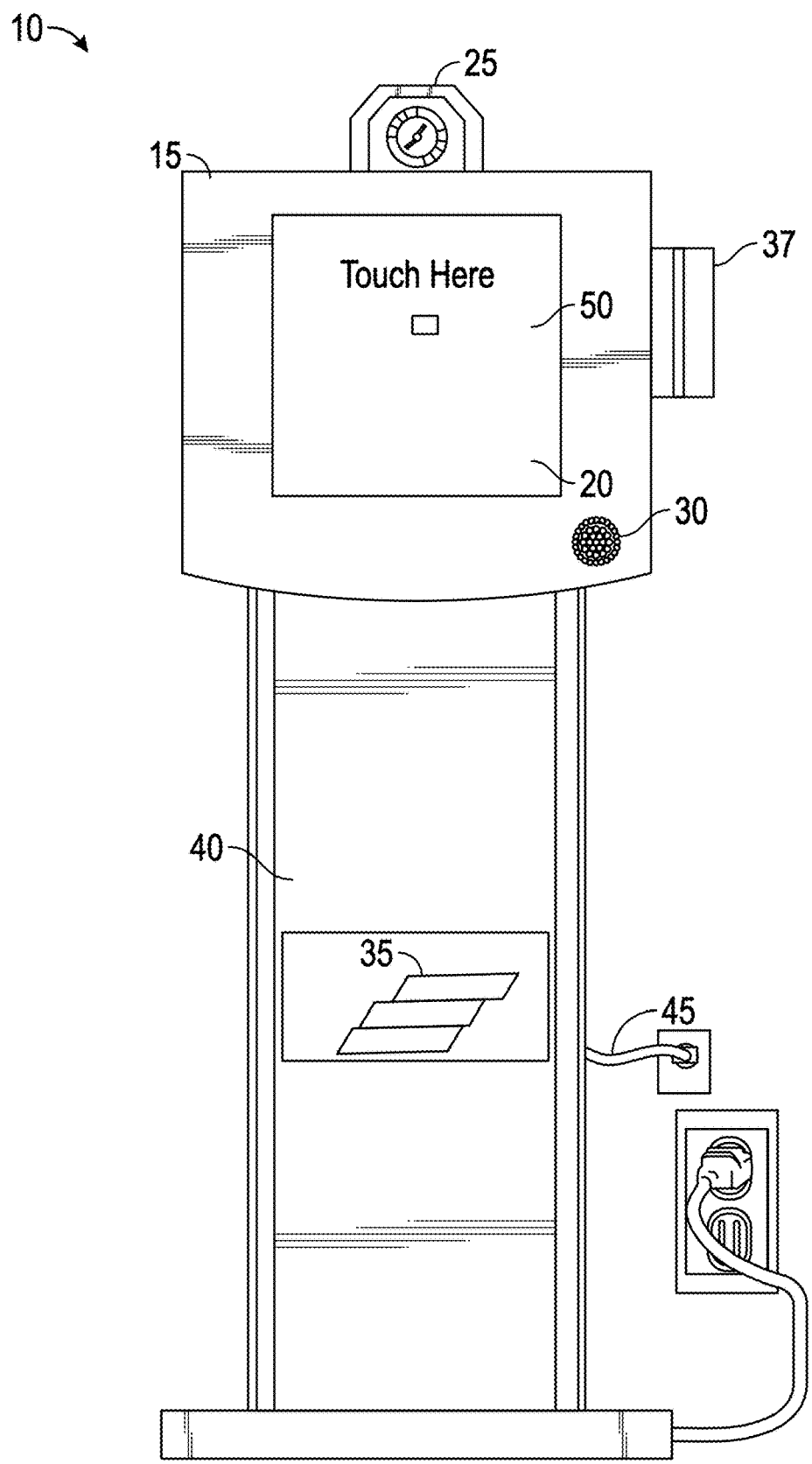
FIG. 2 is a front view of a user apparatus, according to an exemplary embodiment of the present invention.
Figure 4:
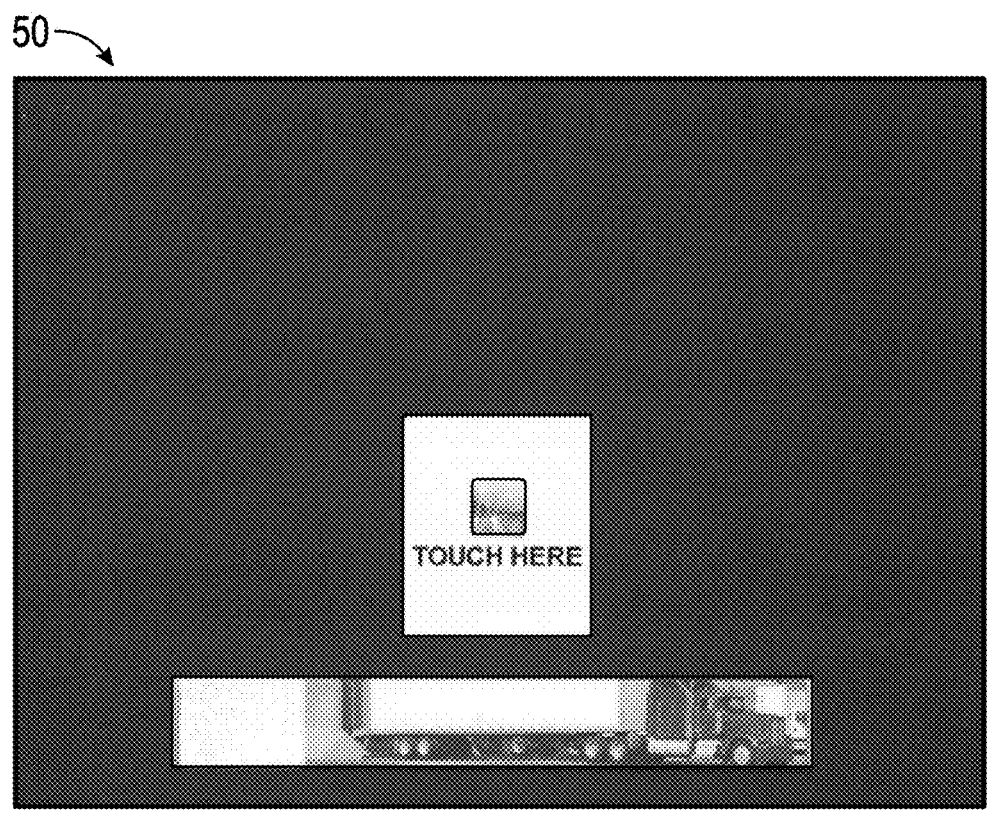
FIG. 4 is a screen view of a user interface of the user apparatus shown in FIG. 2, according to an exemplary embodiment of the present invention.
Figure 5:
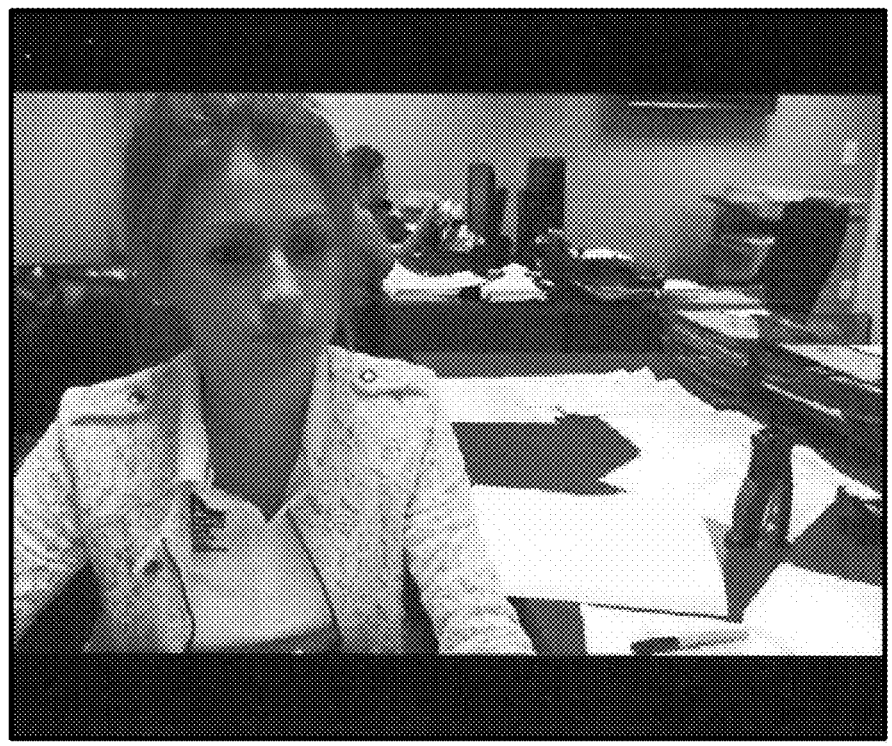
FIG. 5 is a view of a video call as seen from the user interface shown in FIG. 4, according to an exemplary embodiment of the present invention.

FIG. 2 shows an example embodiment of a user apparatus. User apparatus (10) may be similar in size and shape to a vending machine, or, in other variations, may be configured as a wall mounted display. User interface (50) provides for entry and receipt of freight driver information and may be implemented via computer (15), touch screen monitor (20), microphone and speaker (30), as well as a stand (40). Touch screen monitor (20) serves as a communication link between the driver and an administrative system. An exemplary user interface screen (50) is shown in FIG. 4. FIG. 5 is a view of a video call as seen from the user interface shown in FIG. 4. User interface (50) is in communication with the administrator apparatus and/or loading/unloading facility and can obtain information from and communicate information to the driver such as check-in time, assigned loading dock, pick-up/drop-off time, authorization information, driver identifying information, truck and trailer number, scale in/weight documentation, authorized driver release, instructions, etc. In embodiments of the present invention, the user apparatus (10) may be configured to communicate and/or receive this information digitally, visually, audibly, through voice recognition, through scanning devices, or any combination thereof. In one embodiment, the driver simply pushes a single button and is connected to a live administrative representative who instructs the driver what he needs to do and enters information into the system for communication with various components of the system. See, e.g., FIG. 5. In another embodiment, the driver interfaces with an automated administrator apparatus and information may be gathered via voice recognition technologies operable on computer (15) and in communication with the system via a communications network.

Figure 3:
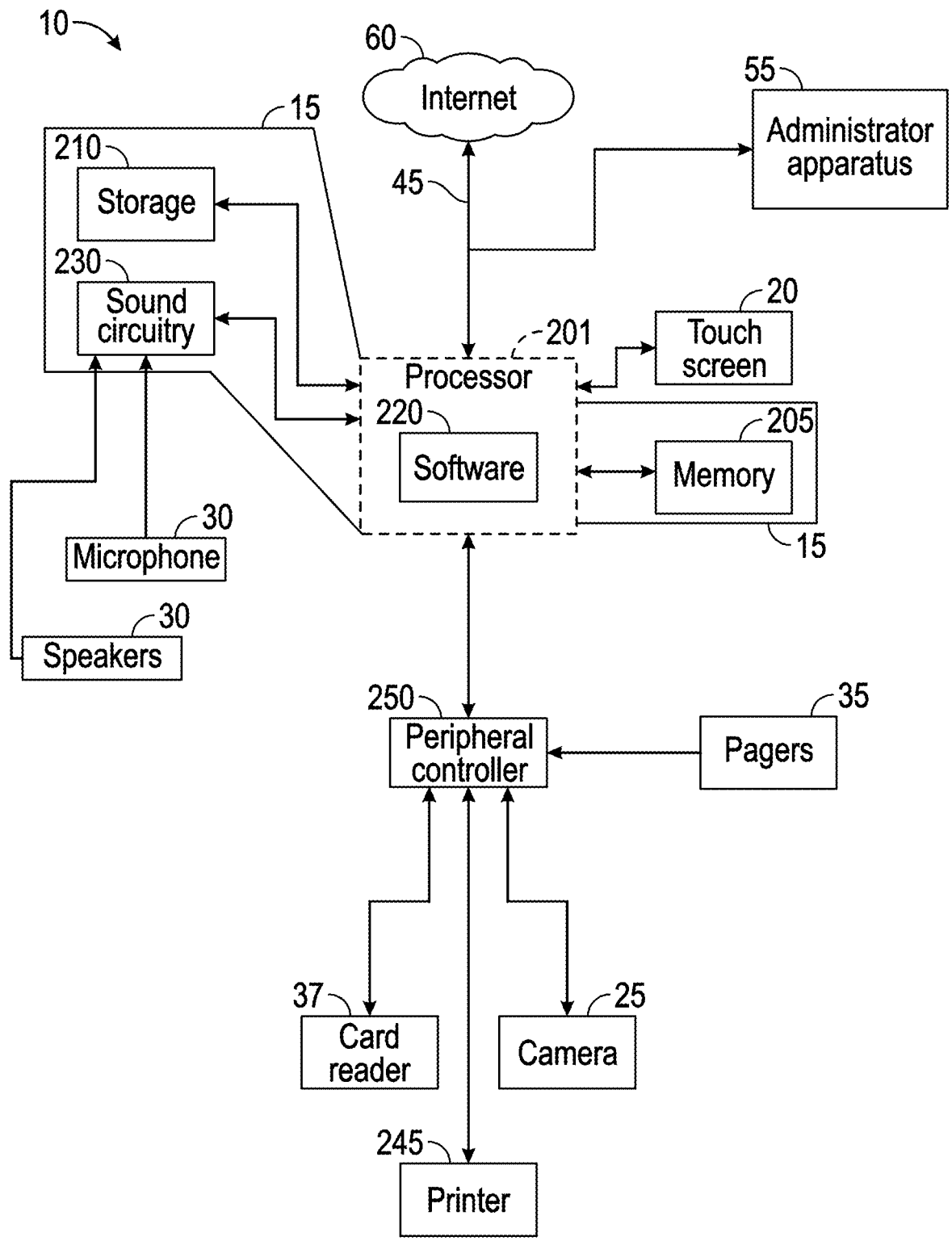
FIG. 3 is a schematic of a system, according to an exemplary embodiment of the present invention.

Computer as used herein, is intended to encompass any suitable processing device. Indeed, the computer may be adapted to execute any operating system including Linux™, UNIX™, Windows™, or any other suitable operating system. In some embodiments, the computer is monolithic with the touch screen, e.g. an HP ENVY Touchsmart™ all-in-one PC. As shown in FIG. 3, the computer (15) may be implemented by a processor (201) running software (220) connected to memory (205), storage (210), and sound circuitry (230). Processor (201) executes instructions, thereby communicating data input from a driver, displaying information sent to the driver, and/or manipulating data. Although described as a single processor, multiple processors may be used according to particular needs. References to processor are meant to include multiple processors where applicable. Memory (205) and storage (210) may include any memory or database module and may take the form of volatile or non-volatile memory including, without limitation, magnetic media, optical media, random access memory (RAM), read-only memory (ROM), removable media, or any other suitable local or remote memory component. Sound circuitry (230) can be any circuit configured to link the processor (201) to the microphone and speaker (30).

Computer (15) implements user interface (50) via software (220). Software (220) may be configured to only have capabilities related to the driver check-in. A minimized interface can be desirable to ensure system security, reliability, and enhance the driver experience. In various embodiments, the software (220) can include Windows 7™ with a bios configured to automatically power and reboot the user apparatus (10) in the event of a power failure. Software (220) can also include Microsoft Lync™ Instant Messenger™ and/or Net stop Kiosk™ to communicate with, secure, manage, and update the user apparatus. Status board software can also be implemented. In some variations, the status board may include a text area up to 4 lines by 120 characters and be executed via ColdFusion™.

Referring back to FIG. 2, stand (40) supports user interface (50) and provides for ergonomic interaction with the components of the same. Stand (40) may be used to support computer (15), touch screen monitor (20), and/or microphone and speaker (30). In some embodiments, the stand (40) can be a custom enclosure, while in others, the stand (40) may simply be a table or other suitable apparatus. Stand (40) may have a flat, curved, and/or any other shape suitable to support components of user apparatus (10).

User apparatus (10) may be configured with various additional embodiments such as a card reader (37), a networking peripheral (45), a pager holder and/or distributor (35), camera (25), optical scanner and/or DOT (Department of Transportation) reader. These features may be linked to user interface (20) via the computer (15) either directly via the computer's processor (201) or through a peripheral controller (250), e.g. serial or USB controller, depending on the nature of the given attachment. In some embodiments, DOT reader may be installed separate from user apparatus (10) in a location near user apparatus (10). In this embodiment, DOT reader may be either physically or wirelessly connected to user apparatus (10). Apparatus (10) may initiate the operation of the DOT reader, which may then work in conjunction with the adjacent user apparatus (10) to verify the identity of the driver. In other embodiments, DOT reader may be installed in a remote/specifically designated location separate and independently from user apparatus (10). In this embodiment, the DOT reader may be used to verify identity of the driver independently/separately from a user apparatus (10). DOT reader is configured to obtain a machine readable DOT number from a (preferably high resolution) image of the side of a vehicle, and upload the DOT number into a driver database. Once in the database, the DOT number may be used to verify the identity of a driver of the vehicle by obtaining matching identification information of the driver, including company information, from the database. The image may be captured using any commercially available camera. DOT reader may be operated via customized algorithms configured to extract the DOT number from the image.

Card reader (37) may be utilized to gather information regarding a driver of a delivery/pick-up vehicle. Card reader (37) may read cards such as payment cards or identity cards. Examples of card readers (37) include manual drag through card readers, motorized card readers, and insertion type push-pull card readers.

User apparatus (10) may include a networking peripheral (45) that connects user apparatus (10) to a remote apparatus, e.g. an administrator apparatus (55) and/or a server (60). Network peripheral (45) may be wired, e.g., via CAT 5 cabling. In other embodiments, a wireless network connection may be provided, e.g., Wi-Fi or cellular.

User apparatus (10) may include a pager holder that distributes pager(s) (35). Pagers (35) may also be distributed at another location by an attendant at the driver facility. Pager (35) may be in communication with user apparatus (10), administrator apparatus (55), administrative personnel, driver facility personnel, loading/unloading facility, and/or loading/unloading facility personnel. Pager (35) allows a driver to depart from the user apparatus (10), e.g. in excess of 1 mile, and still wirelessly receive notifications. Pager (35) may also be used to locate a driver. In some instances, pager (35) may be, specifically, in communication with the network peripheral (45) of the user apparatus (10). This configuration can permit a page to come from a distant location. Examples of commercially available pagers include Jtech Inteliflex™

In some embodiments, pager (35) is connected to computer (15); however, pager (35) may, instead, be connected to a second computer which is a further component of the user apparatus (10). The second computer can include a second network peripheral including, for example, a Hamachi™ VPN.

Camera (25) may also be included with user apparatus (10). In some embodiments, camera (25) may be a megapixel facial recognition camera. Camera (25) may allow a driver to engage in video communications with a remote apparatus, e.g. an administrator apparatus (55). Camera (25) may have a field of vision to capture an area adjacent to the driver while the driver is in its field of view. Camera (25) images may be used by software (220) for security, video logging, and facial recognition. Camera (25) images may also be used in conjunction with a DOT reader to extract a DOT number from a camera (25) image obtained from the side of a vehicle. Examples of cameras (25) include commercially available webcams, e.g. Logitech™ HD Webcam.

Printer (245) may be included with user apparatus (10). Printer (245) may print information as instructed by computer (15). Printer (245) may be, in various embodiments, a laser printer, label printer, or receipt printer. Software (220) can print information for the driver using printer (245) either a) via the user apparatus (10) or b) from a remote command received, for example, over the network peripheral by an administrator apparatus (55).

Figure 6:
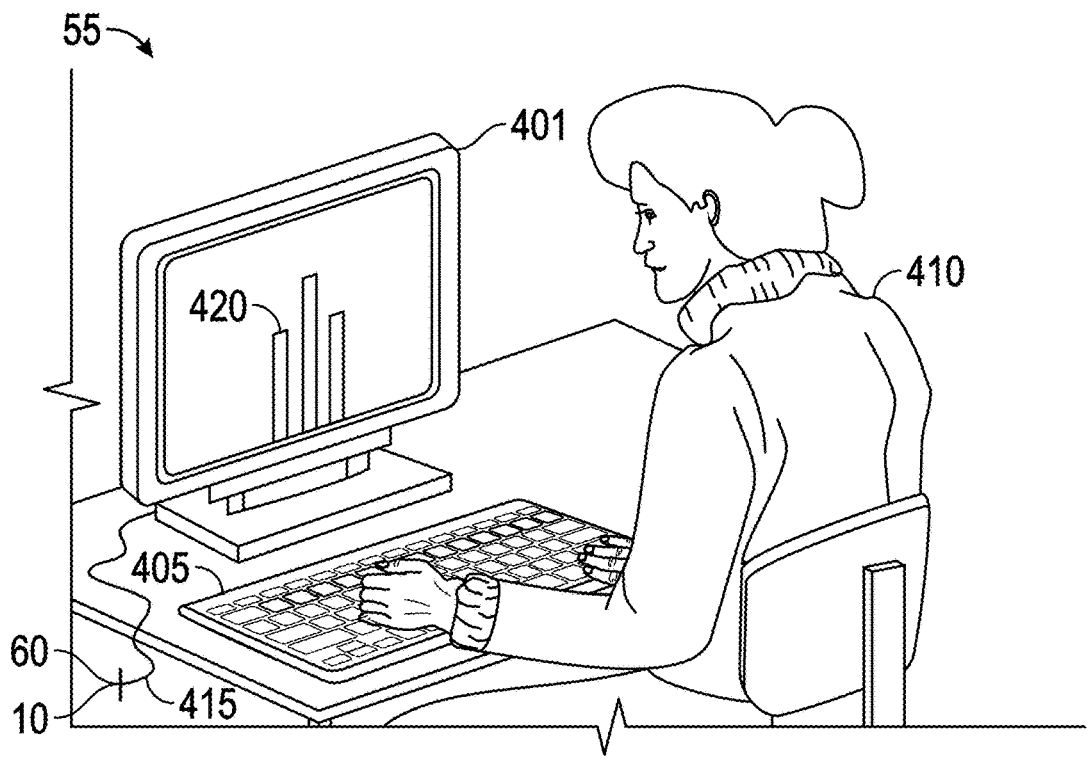
FIG. 6 is a front view of an administrator apparatus, according to an exemplary embodiment of the present invention.

FIG. 6 shows an administrative apparatus (55) according to an exemplary embodiment of the present invention. Administrator system and/or apparatus (55) is shown with administrative personnel (410); however, some or all of it may be automated. Administrative system (55) communicates with user apparatus (10) as well as the loading/unloading facility (64). Administrative system and/or apparatus (55) coordinates and controls the logistics of a delivery/pick-up.

Implementation of administrator apparatus (55) may include a software driven computer (401) with video call functionality displaying an administrator interface (420), as well as a keyboard for data entry (405) and a network connection (415). Administrator apparatus computer (401) may run a variety of software. In some embodiments, the administrator apparatus computer (401) runs Microsoft Lync™ Instant Messenger Client™.

Figure 7:
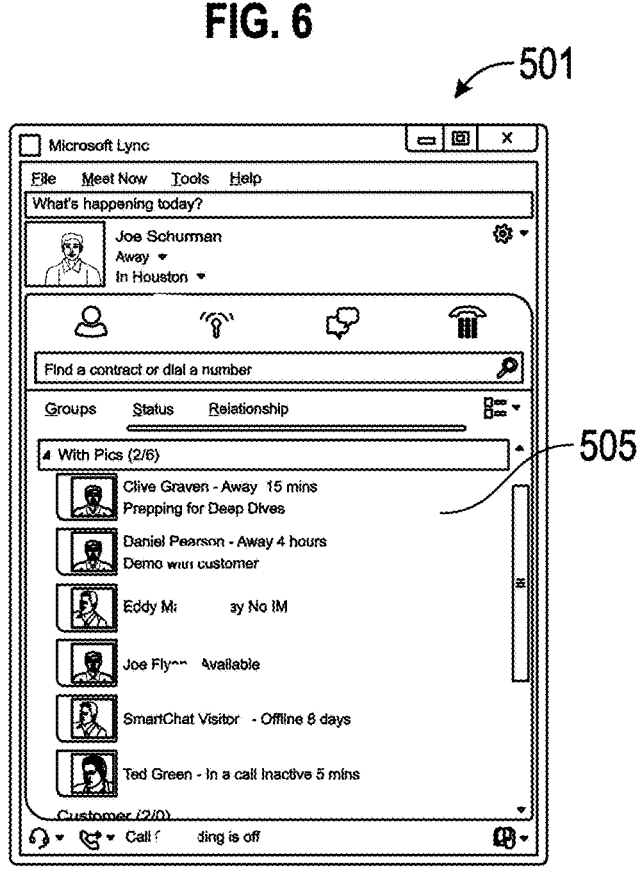
FIG. 7 is a screen view of the administrator apparatus shown in FIG. 6.

When no call is incoming to administrator apparatus (55), a window (501) may be displayed on administrator apparatus (55), as shown in FIG. 7, showing the status of the administrator apparatus (55) and available clients to initiate a call (505). Administrator apparatus (55) can also, optionally, view camera (25) of user apparatus (10) to monitor the driver facility when no call is ongoing.

According to certain embodiments of the present invention, a driver approaches a user apparatus (10) and commences a video call with an administrator apparatus (55). When a call is initiated from user apparatus (10), a popup message plays a ringing sound and displays the name of the location that the call is coming from. The call may be displayed on multiple administrator apparatuses (55). Once an administrator (410) clicks "accept call", the call notification disappears and the administrator (410) is connected to the driver located at a user interface (10). Driver and administrator (410) may communicate via camera, text and/or speakers. Administrator (410) answers questions the driver has and enters in relevant information, e.g. truck and trailer number, driver identifying information, scale in/weight documentation, carrier safety certification, etc., into administrator apparatus (55). Information received at the user apparatus (10) may be used to ensure the driver and/or load are authorized, and provide an authorized driver release with relevant instructions. If there is a problem, e.g., improper load, improper load weight, revoked driver's license, etc., the driver can be flagged and automatically reported by the system to the appropriate authority. The inputted information is either stored in computer (405) or via the network connection to other system components such as the loading/unloading facility (64) and/or computer (15) of user apparatus (10). In certain embodiments, some or all of the information from a driver is gathered at user interface (50) and automatically sent to administrator apparatus (55) and the driver interfaces with an automated administrative computer system.

Administrative apparatus (55) and/or user apparatus (10) may be in communication with loading/unloading facility (64) and query available docks. Sensors may be provided at each loading/unloading dock of loading/unloading facility (64) and in communication with administrative apparatus (55) and/or user apparatus (10) as to availability. Alternatively, personnel at loading/unloading facility (64) may be in communication with administrator apparatuses (55) and/or administrators (410). If an available dock is located, information is displayed to administrator (410) at administrator apparatus (55) and/or forwarded to the user apparatus (10). Administrator (410) may then, through the video connection or other communication devices, communicate with the user apparatus (10) and instruct the driver to proceed to the appropriate loading dock.

If an available loading dock cannot be located, the driver may be assigned by the administrative apparatus (55) and/or user apparatus (10) a pager. An appointment for the driver may then be scheduled by the system. Once an available loading dock is located, the assigned pager (35) is messaged, e.g. by the administrator (410) and/or user apparatus (10). The driver may then initiate a new call at the user apparatus (10). Once connected to an administrator (410), the driver/trucker is directed to the available dock. In additional exemplary embodiments, the administrative apparatus (55) can display a queue at the user apparatus (10) and/or directly instruct the driver/trucker to an available dock without the use of an administrator (410).

Figure 8:
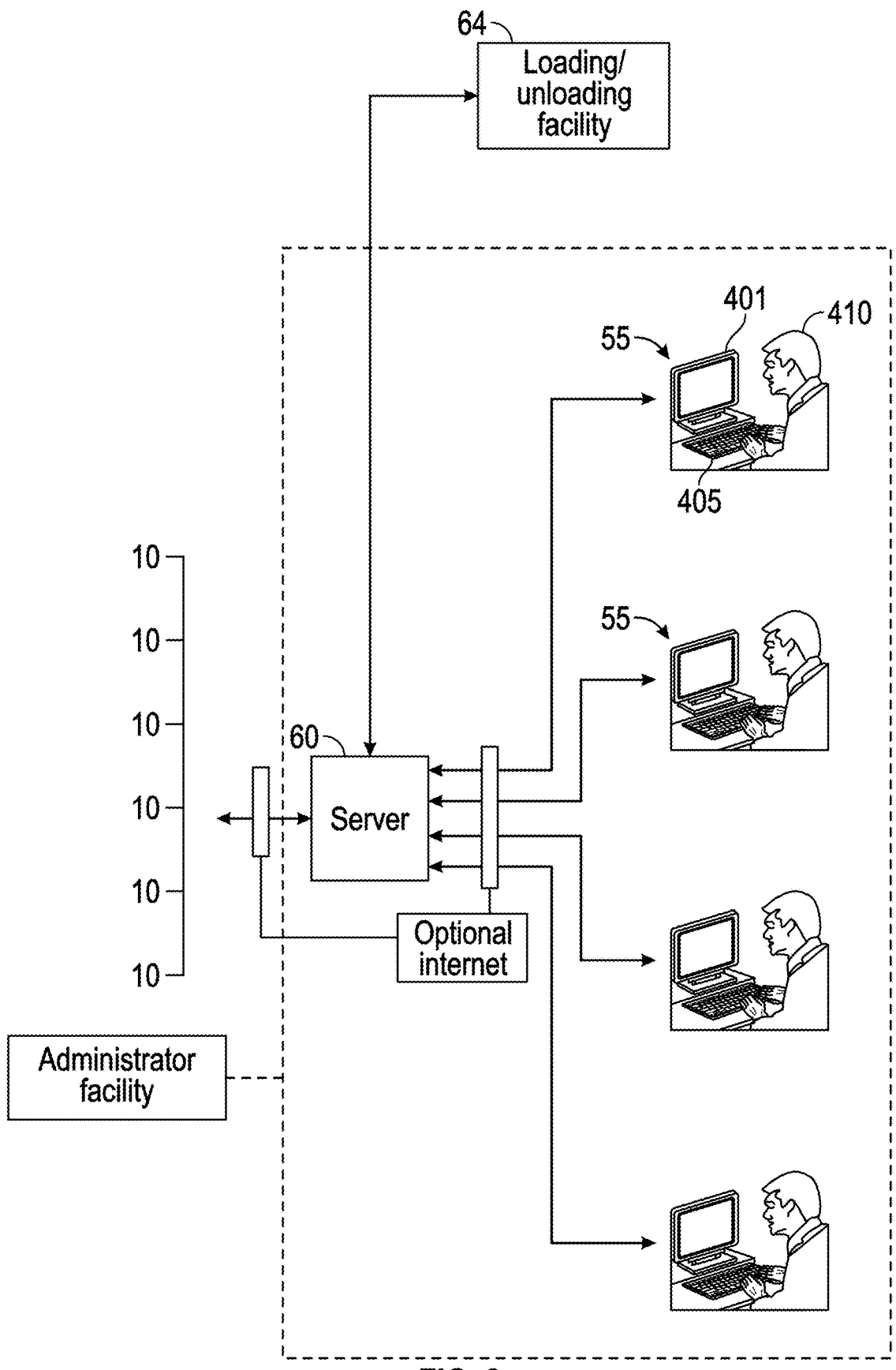
FIG. 8 is a schematic of multiple user apparatuses and multiple administrator apparatuses, according to an exemplary embodiment of the present invention.

Embodiments of the present invention provide for utilization of multiple user apparatuses (10) and/or multiple administrator apparatuses (55). As shown in FIG. 8, six user apparatuses (10) are connected to the Internet and communicate with server (60). Four administrator apparatuses (55) are connected to the Internet and in communication with server (60). Additionally loading/unloading facility (64) is connected to the Internet and in communication with server (60). In embodiments of the present invention, other suitable networks may be used with or without a server (60).

Server (60) may be used to facilitate communications between user apparatuses (10), administrator apparatuses (55), loading/unloading facility (64), and/or other components of the system as described herein. The use of a server (60) can diminish the computing requirements of the user apparatus (10) and administrative apparatus (55). Server (60) can be in various embodiments either a physical server, for example, an IBM M4 Tower™, or a server hosted through the internet, e.g. Amazon™ Web Services.

Server (60) may serve to further aid in the coordination of delivery/pick-up arrival at a loading/unloading facility (64) by automating elements of the system. Examples of the interaction of server (60), user apparatuses (10), administrator apparatuses (55) and/or loading/unloading facility (64) can be seen in FIG. 8.

Accordingly to an exemplary embodiment of the present invention, a driver is advised to check in at a user apparatus (10) located remotely from loading/unloading facility (64) at an off-site drivers lounge. The driver upon arrival touches the touch screen (20) of the user apparatus (10) and initiates a video call to the server (60). Server (60) rings multiple administrative apparatuses (55), and after an administrator (410) at an administrator apparatus (55) accepts the call, the server (60) connects the call and stops the ringing. Administrator (410) then inputs relevant information, such as trailer and truck number, into the server (60) using the administrator apparatus (55).

Server (60) is in communication with loading/unloading facility (64) and queries a driver database to attempt to locate an available dock. Sensors may be provided at each loading/unloading dock of loading/unloading facility (64) and in communication with server (60) as to availability. Alternatively, personnel at loading/unloading facility (64) may be in communication with server (60), administrator apparatuses (55) and/or administrators (410). If server (60) is communicated to and is able to locate an available dock, the available dock information is displayed to administrator (410) at administrator apparatus (55). Administrator (410) then through the video connection or other communication devices communicates with the user apparatus (10) and instructs the driver to proceed to the appropriate loading dock.

If the server (60) is unable to locate an available loading dock, the driver is assigned by the server (60) a pager from the user apparatus (10). Once the server (60) locates an available loading dock, the server (60) messages the assigned pager (35). The driver then initiates a new call at the user apparatus (10). Once connected to an administrator (410), the driver/trucker is directed to the available dock. In additional exemplary embodiments, the server (60) can display a queue at the user apparatus (10). The various embodiments described herein may also be implemented without a server (60).

Figure 9:
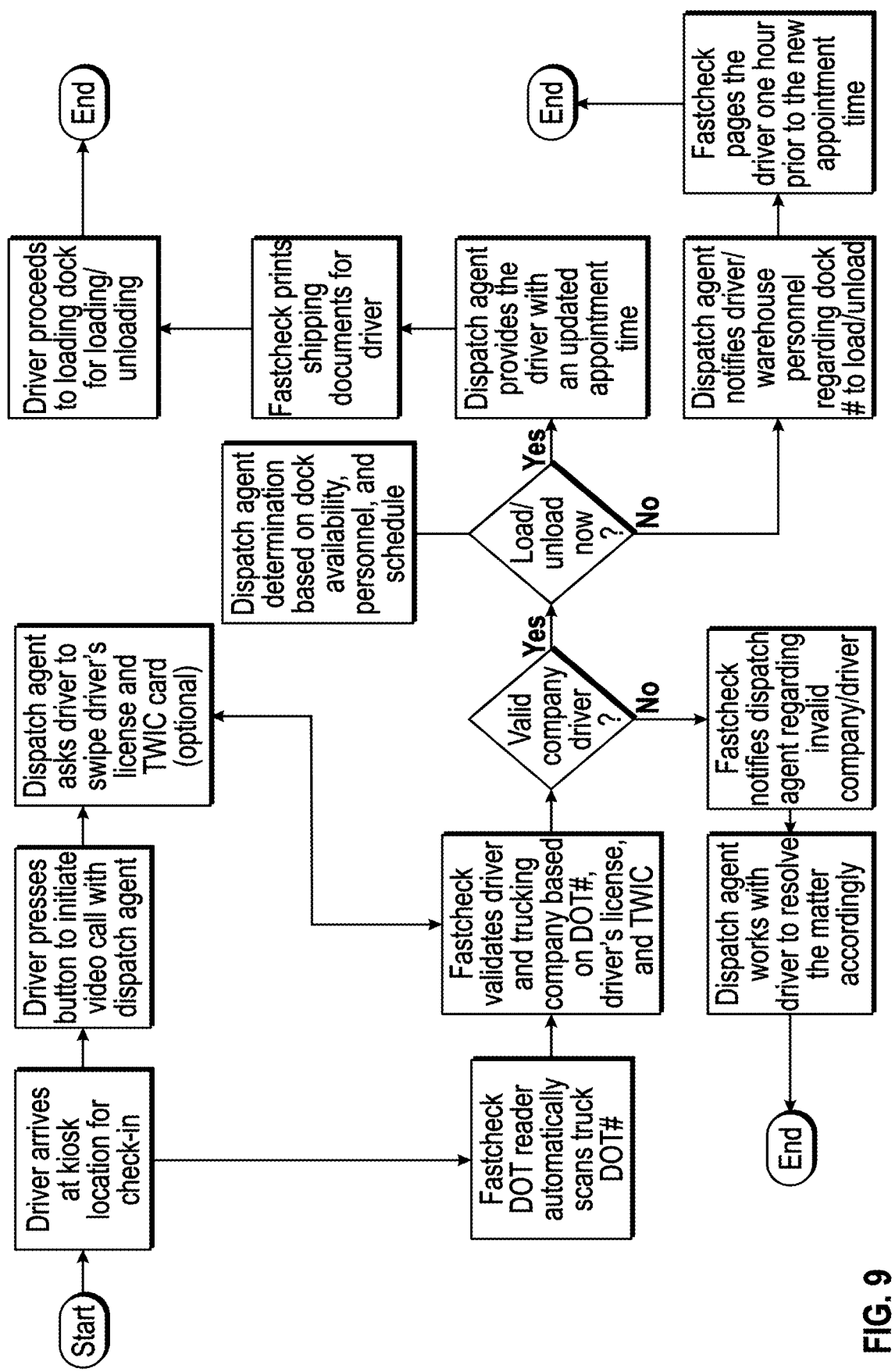
FIG. 9 is a flow chart showing a freight delivery/pick-up system using a dispatch agent, according to an exemplary embodiment of the present invention.
Figure 10:
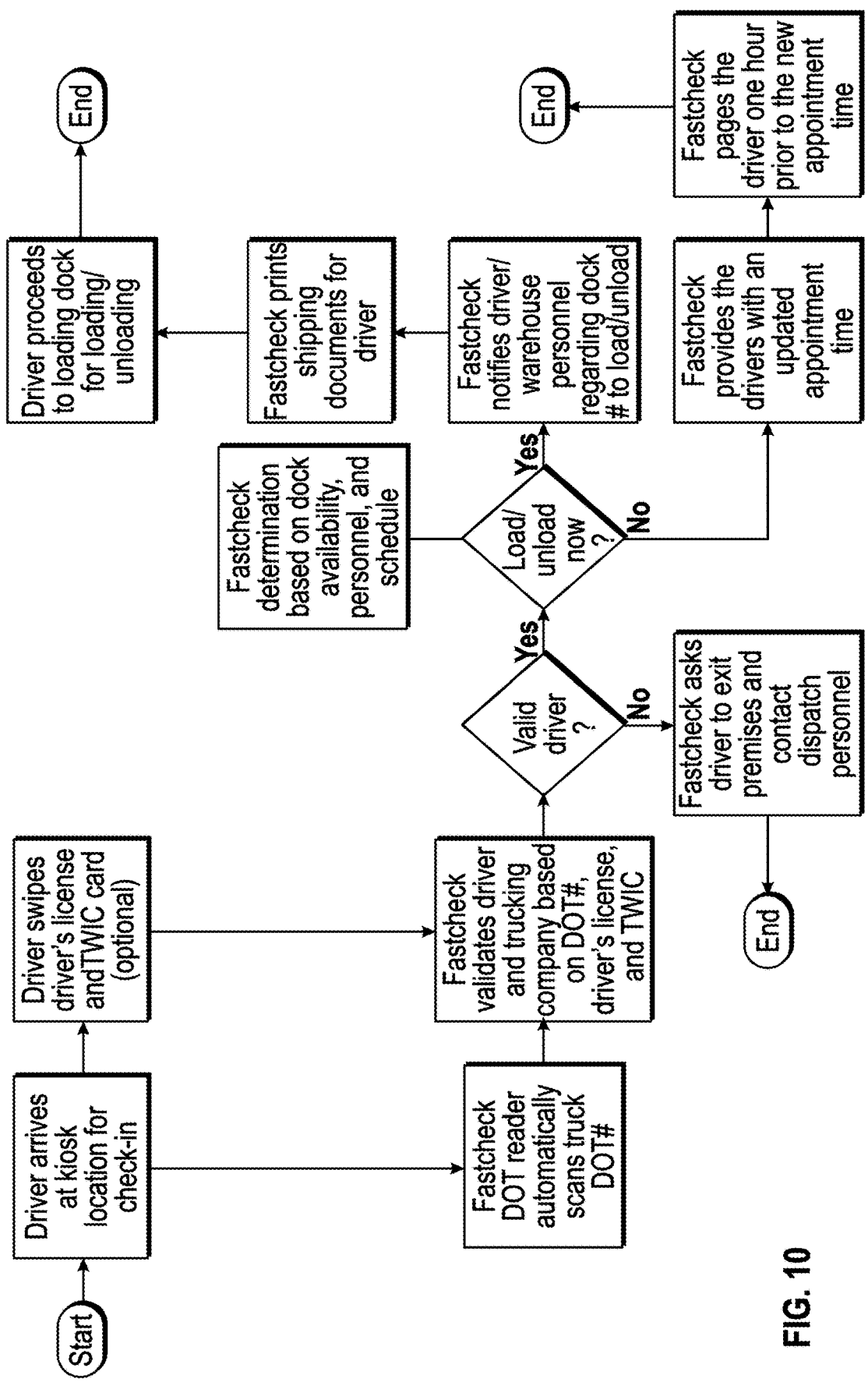
FIG. 10 is a flow chart showing an automated freight delivery/pick-up system, according to an exemplary embodiment of the present invention.

FIG. 9 shows a freight delivery/pick-up system using a dispatch agent, according to an exemplary embodiment of the present invention. FIG. 10 shows an automated freight delivery/pick-up system, according to an exemplary embodiment of the present invention. The systems described in FIGS. 9 and 10 may be implemented using the apparatuses, systems and methods described herein, including various embodiments thereof.

Referring to FIG. 9, a freight delivery/pick-up system includes the following steps. A driver/user arrives at a location of a user apparatus/kiosk (10) for check-in. The driver presses a button to initiate a call with a dispatch agent. The call may be a video or audio call. The dispatch agent then asks the driver/user to swipe his/her driver's license, TWIC (Transportation Worker Identification Credential) card, and/or other form of similar identification. In other embodiments, a DOT reader on the user apparatus/kiosk (10) may automatically scan a related truck DOT number to get this information. Alternatively, DOT reader may be located separately and/or independently from user apparatus (10). The system then validates the driver/user and his/her trucking company based on the driver's license, TWIC card, and/or DOT #, and determines whether the user/driver is a valid company driver. If not valid, the system notifies the dispatch agent regarding the invalid user/driver and/or company. The dispatch agent then works with the user/driver to resolve the matter accordingly. If a valid driver, the dispatch agent determines whether the driver/user may perform loading/unloading at this time based on dock availability, warehouse personnel, and schedule. If no dock is available, the dispatch agent provides the driver/user with an appropriate appointment time, and then pages the driver/user an hour prior to the new appointment time. If a dock is available, the dispatch agent notifies the driver/user and warehouse personnel regarding the particular dock and/or dock number to perform the loading/unloading. The system is then used to print relevant documents, including shipping documents, for the driver/user to take to the dock. The driver/user then proceeds to the dock for loading/unloading.

Referring to FIG. 10, an automated freight delivery/pick-up system is described. This automated system may provide for the same steps as disclosed herein for systems using a dispatch agent, however, the system may be fully automated such that a dispatch agent is not required. Alternatively, a system may be provided that is partially automated and uses a dispatch agent as needed.

Figure 15:
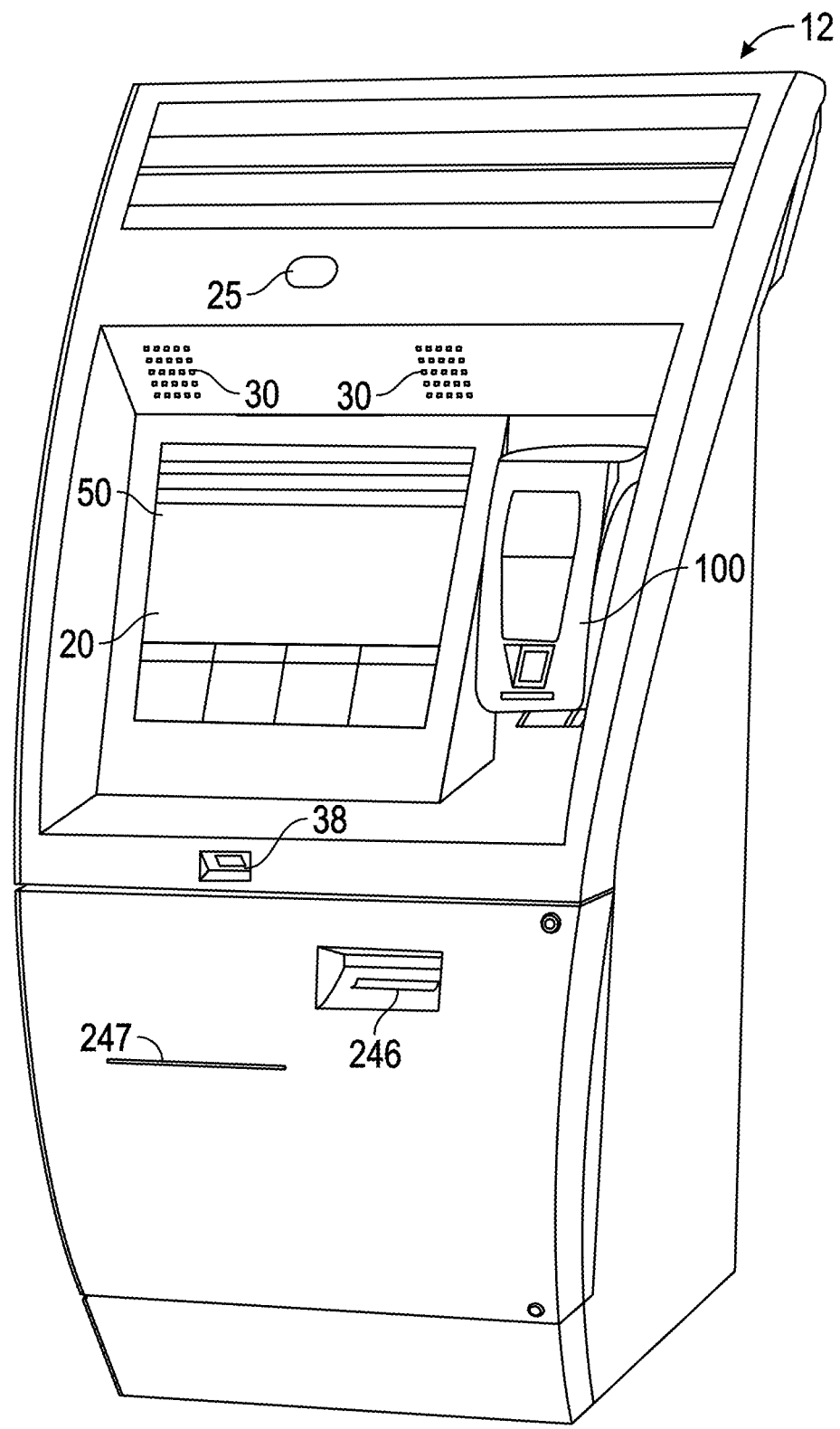
FIG. 15 is a perspective view of a Model II user apparatus, according to an exemplary embodiment of the present invention.

FIGS. 11 to 14 show different views of a Model I user apparatus (11). FIG. 15 shows a Model II user apparatus (12). Model I and Model II user apparatuses (11, 12) represent different embodiments of user apparatus (10). Model I and Model II user apparatuses (11, 12) may have substantially the same features as user apparatus (10), including but not limited to user interface (50), computer (15), touch screen monitor (20), microphone and speaker (30), stand (40), and camera (25), but may include additional features/modifications. Model I and Model II user apparatuses (11, 12) may be implemented, as appropriate, in place of or in addition to user apparatus (10) as described herein.

Model I and Model II user apparatuses (11, 12) have a substantially curved front portion designed to provide a sleeker profile. See FIGS. 12 and 15. Alternatively, both apparatuses (11, 12) may have a flat, rounded, and/or any other shape necessary to perform their functions.

Model I and Model II user apparatuses (11, 12) include a slot for a badge printer (246) located on the front of the apparatuses (11, 12). See FIGS. 13 and 15. As shown, badge printer (246) allows users to print adhesive badge labels that affix to plastic badges. Badge printer (246) may also print non-adhesive badges. Badge labels may include identifying information of a driver/user, including driver name, title, company name, and/or any other relevant information. Badge printer (246) may be located either within user apparatuses (11, 12) or located adjacent to apparatuses (11, 12).

Model I and Model II user apparatuses (11, 12) further include a slot for a printer configured to print on 8½"×11" paper ("8½×11 printer") (247) located on the front of the apparatuses (11, 12). See FIGS. 11 and 15. As shown, 8½×11 printer (247) allows drivers/users to print a variety of documents, including shipping and freight delivery documents such as a bill of lading. Bill of lading documents shipments/cargo while giving title to a specified party (e.g. delivery warehouse operator). 8½×11 printer (247) may be located either within user apparatuses (11, 12) or located adjacent to apparatuses (11, 12).

Model I and Model II user apparatuses (11, 12) include a barcode scanner (38) located on the front of the apparatuses (11, 12). See FIGS. 13 and 15. Barcode scanner (38) is configured to read 1D or 2D barcodes. As shown, barcode scanner (38) has a clear rectangular face that scans a barcode, for e.g., 2D barcode of a driver's license, placed in front of scanner (38). Scanner (38) may then pull information from the driver's license and display the information on the user interface (50). Alternatively, barcode scanner (38) may have any other configuration to scan barcodes.

Figure 11:
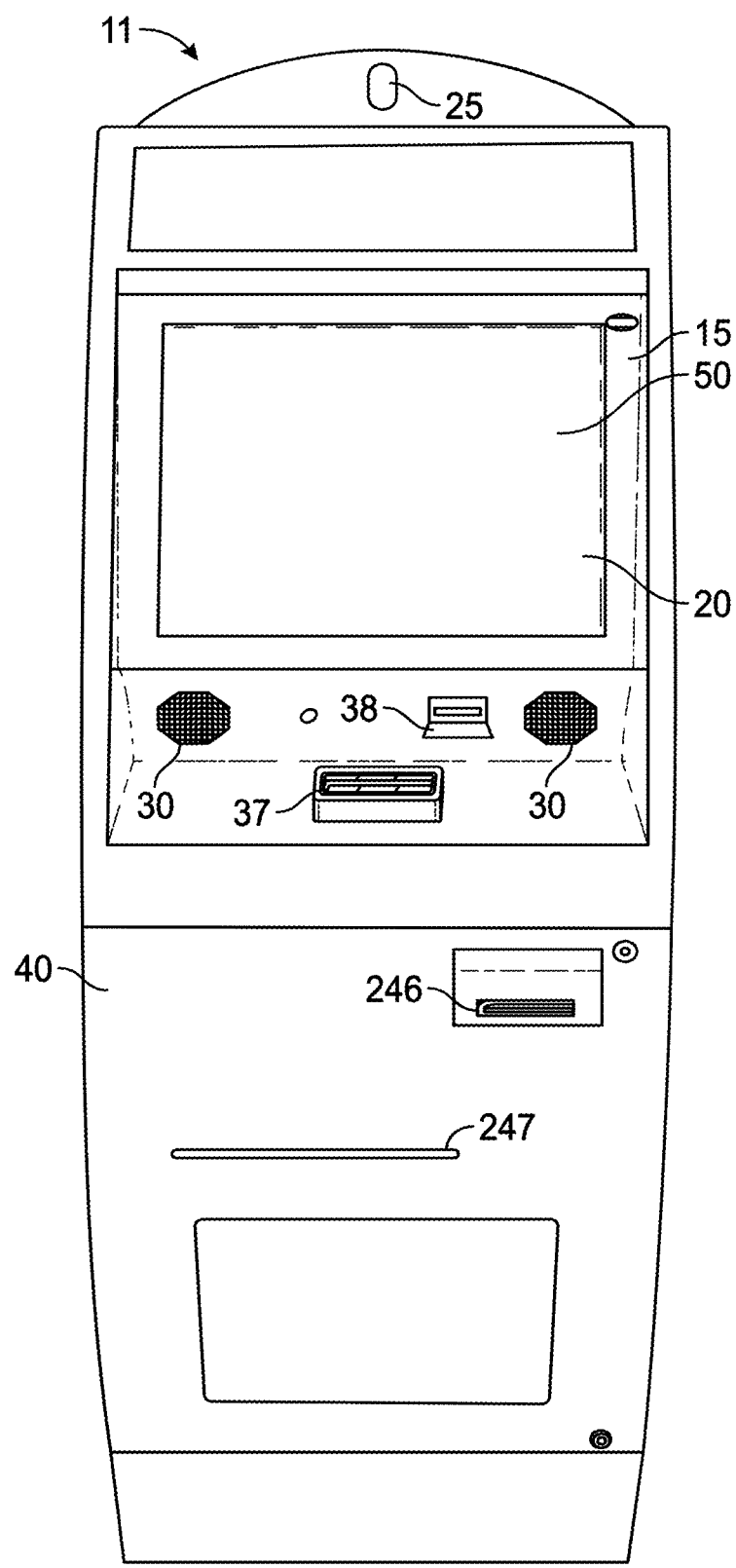
FIG. 11 is a front view of a Model I user apparatus, according to an exemplary embodiment of the present invention.
Figure 12:
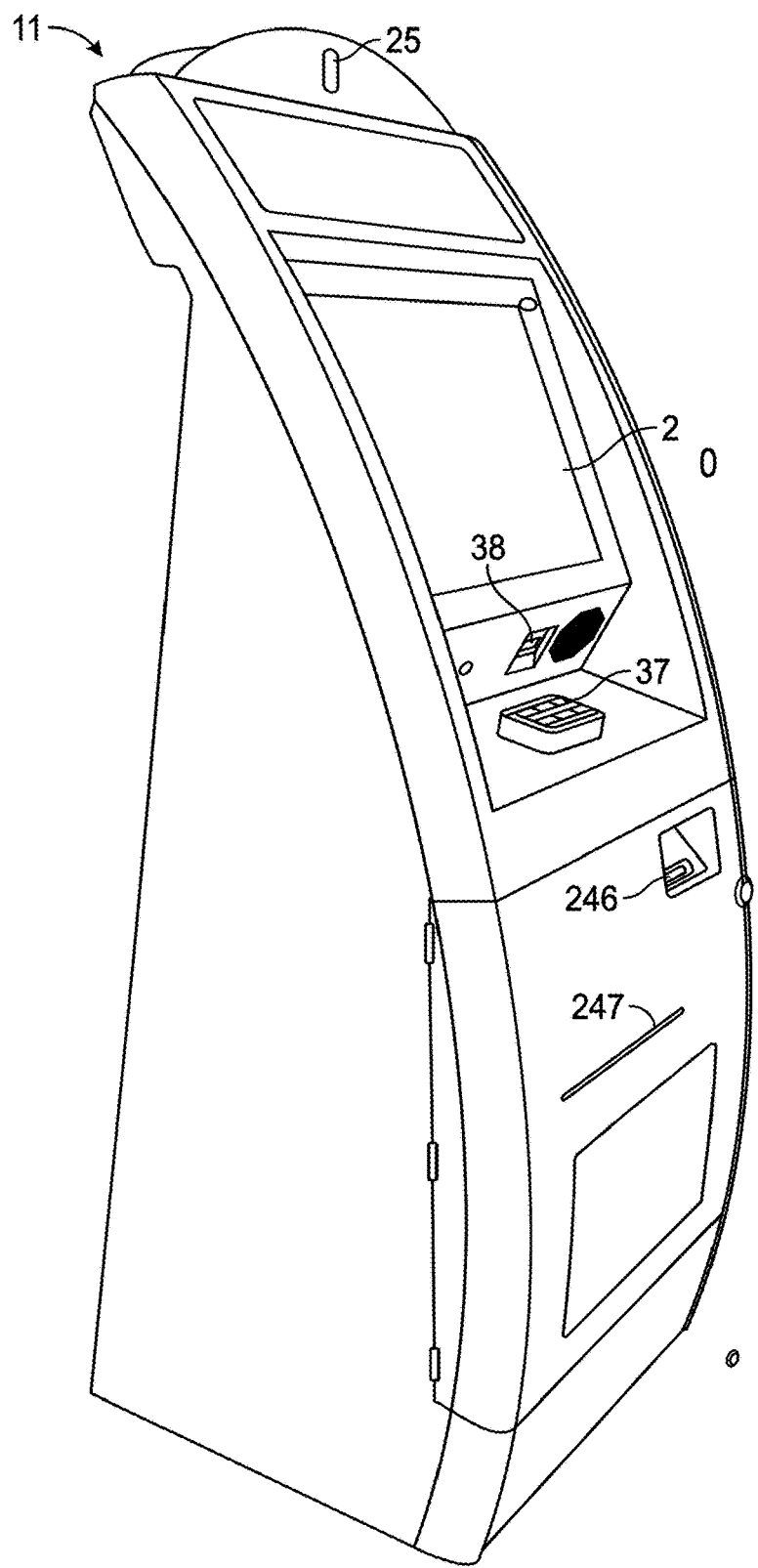
FIG. 12 is a perspective view of the user apparatus shown in FIG. 11.
Figure 13:
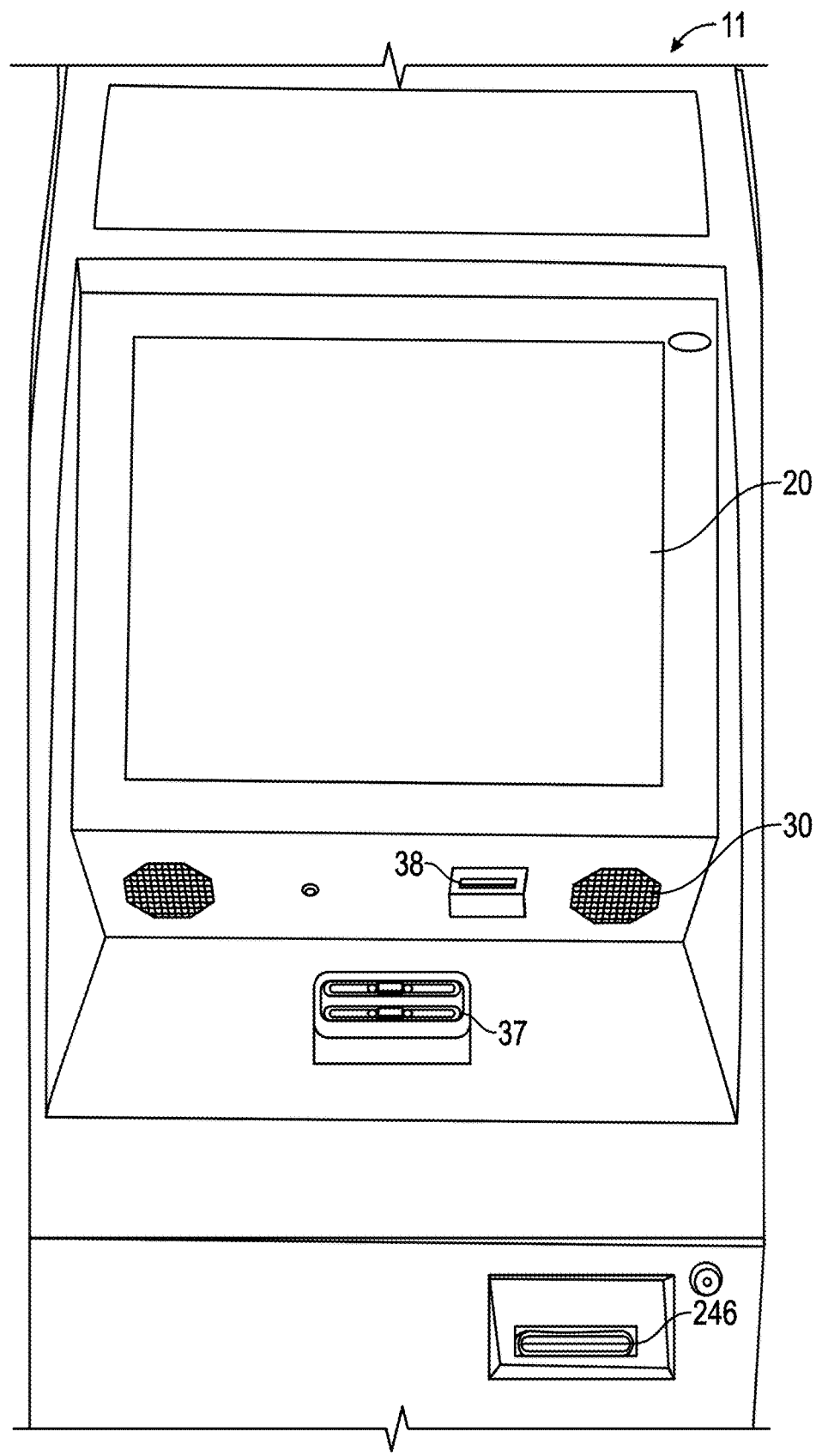
FIG. 13 is a fragmented close-up front view of the user apparatus shown in FIG. 11.
Figure 14:
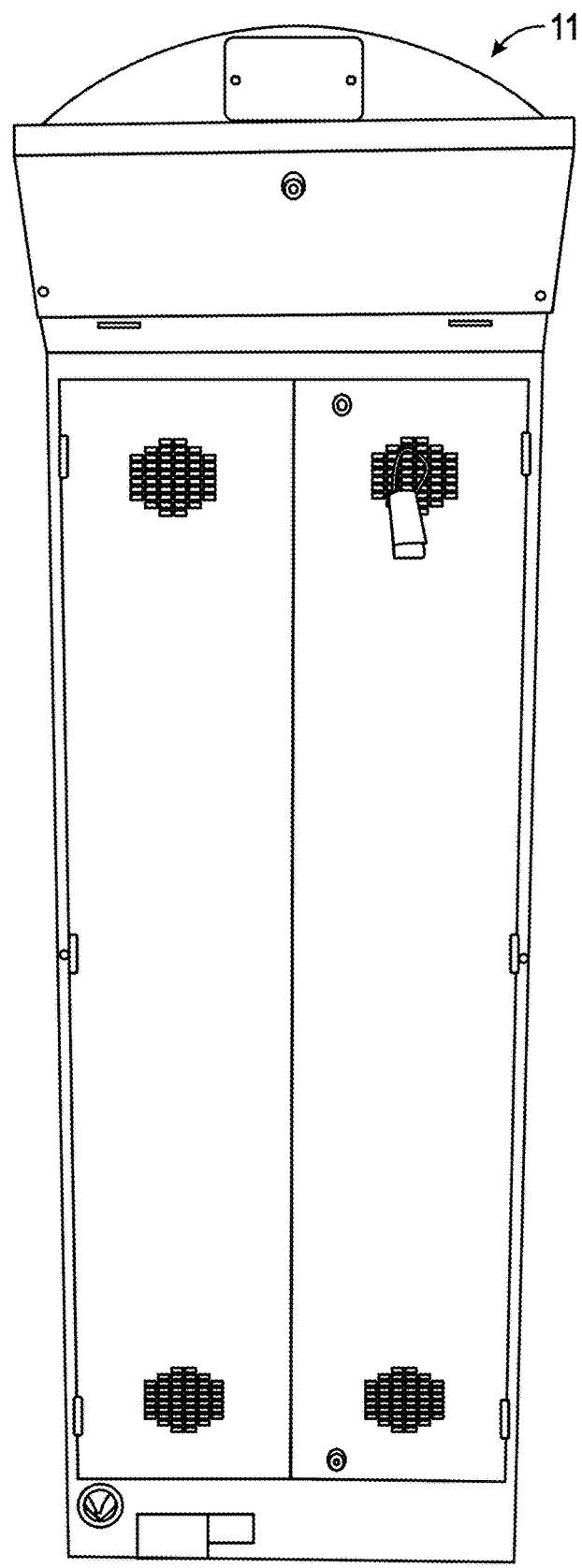
FIG. 14 is a back view of the user apparatus shown in FIG. 11.

Like user apparatus (10), Model I user apparatus (11) includes a card reader (37) having the same features disclosed herein. As shown in FIG. 11, card reader (37) in user apparatus (11) is installed on the front of the apparatus (11). However, card reader (37) may be placed on any other location on the user apparatus (11). Card reader (37) may be a magnetic stripe/magstripe reader configured to read information encoded in the magnetic stripe located on the back of a plastic badge and/or other documents containing identifying information. For example, card reader (37) may read magnetic strips of credit cards or driver's licenses, and may also be configured to read passports.

In other embodiments, Model II user apparatus (12) may be implemented in place of or in conjunction with user apparatus (10) and/or Model I user apparatus (11) in various embodiments of the present invention described herein. Model II user apparatus (12) includes a reader (100) for reading a TWIC card and configured to act as a separate identification mechanism for user/driver. As shown in FIG. 15, reader (100) is installed on the front of the apparatus (12). However, reader (100) may be placed on any other location on the user apparatus (12). A kiosk apparatus having a TWIC card reader for reading a passenger's TWIC card is disclosed in U.S. Pub. No. 2013/0226632, which is incorporated herein by reference. A TWIC card may be read in different ways. First, TWIC card may contain a passive RFID chip that contains information (including fingerprint information) about the TWIC card and driver/user. Reader (100) may be an RFID reader configured to pull this information/data via a wireless Near Field Communication (NFC) connection. Second, reader (100) may be a contact-based smart card reader which, like the RFID based chip, contains information about the TWIC card and driver/user. Reader (100) can validate and authenticate the TWIC card and verify the identity of a driver using the card at any designated access control points, ensuring that only those who are intended to have privileged access are able to enter secure facilities.

As shown, reader (100) is a biometric (fingerprint) access control reader and/or fingerprint scanner used in conjunction with the user/driver's TWIC card. Particularly, a TWIC card may contain an image of the user/driver's fingerprint that will be matched against his or her fingerprint scanned during check-in. Reader (100) may have a wireless NFC connection located on the top of reader (100), and a slot at the bottom of the reader (100) to physically insert the TWIC card. Reader (100) may further provide for an additional PIN authentication mechanism by including a keypad configured so that user/driver may enter a PIN matched to his/her TWIC card. In some embodiments, Model II apparatus (12) may further include a TWIC smart card reader with video and/or audio capture. Thus, reader (100) may be customized to include single or multiple factor authentication mechanisms as needed. Single authentication factors include fingerprint, pin, or card, while multi-factor authentications combine three or four credential authenticators enabling more stringent security access controls where it is required.

Examples of reader (100) include commercially available readers such as 3M™ MiY-Touch Biometric Access Control Reader, 3M™ MiY-Search Biometric Access Control Reader, 3M™ MiY-Card/MiY-Card-GOV Biometric Access Control Reader, and/or 3M™ MiY-ID/MiY-ID-GOV Biometric Access Control Reader. 3M™ readers are designed to perform fast and accurate biometric and credential authentication, and can interface with most physical access control systems and support most government issued credentials. 3M readers can also easily facilitate third party integration.

Model II apparatus (12) and/or Model I apparatus (11) may further include a DOT reader. DOT reader may include all the same features as disclosed herein for apparatus (10). DOT reader is configured to obtain a machine readable DOT number from a (preferably high resolution) image of the side of a vehicle, and upload the DOT number into a driver database. Once in the database, the DOT number can be used to verify the identity of a driver of the vehicle by obtaining matching identification information of the driver, including company information, from the database. As disclosed herein, DOT reader may be installed on apparatuses (11, 12), at a location adjacent to and/or (physically or wirelessly) connected to apparatuses (11, 12), or may be installed separately/independently from apparatuses (11, 12) at remote/specifically designated locations to function as a separate identity verification system from apparatuses (11, 12).

In some embodiments, Model II apparatus (12) may include a VoIP (Voice over IP) intercom system for the delivery of audio and multimedia sessions over IP networks, including the Internet.

Model I and Model II user apparatuses (11, 12) may be configured and/or customizable to any other type of scanners, readers, printers, and/or any other features and components of user apparatuses (10, 11, 12) disclosed herein.

Figure 16A:
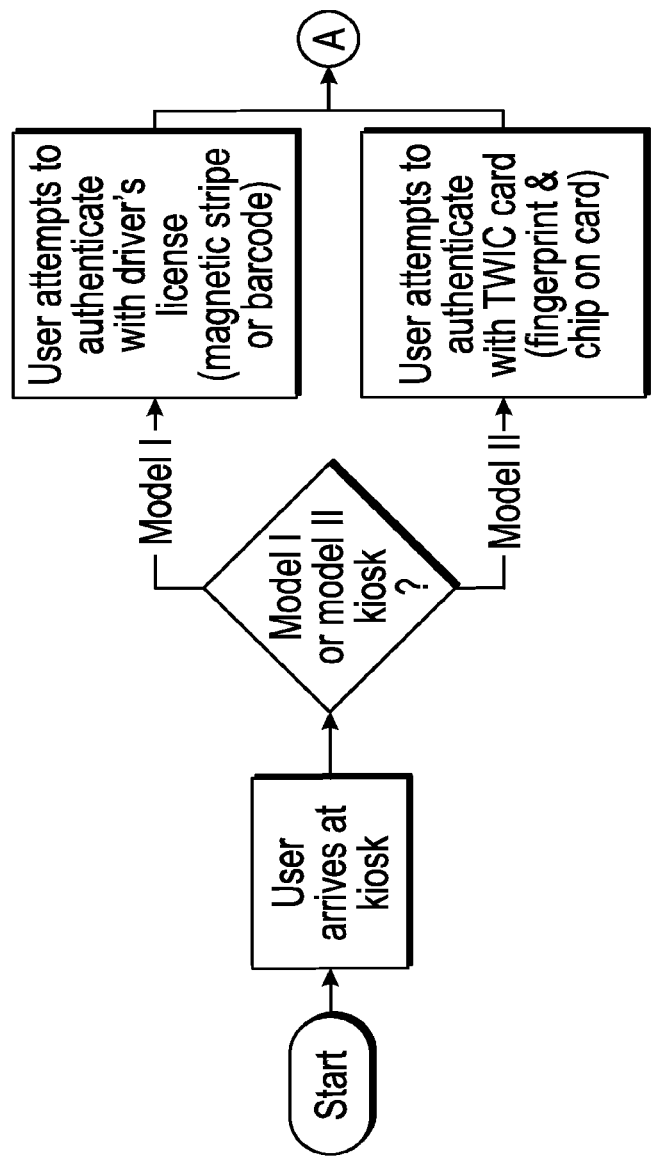
FIGS. 16A and 16B are flow charts showing an automated freight delivery/pick-up system, according to an exemplary embodiment of the present invention.
Figure 16B:
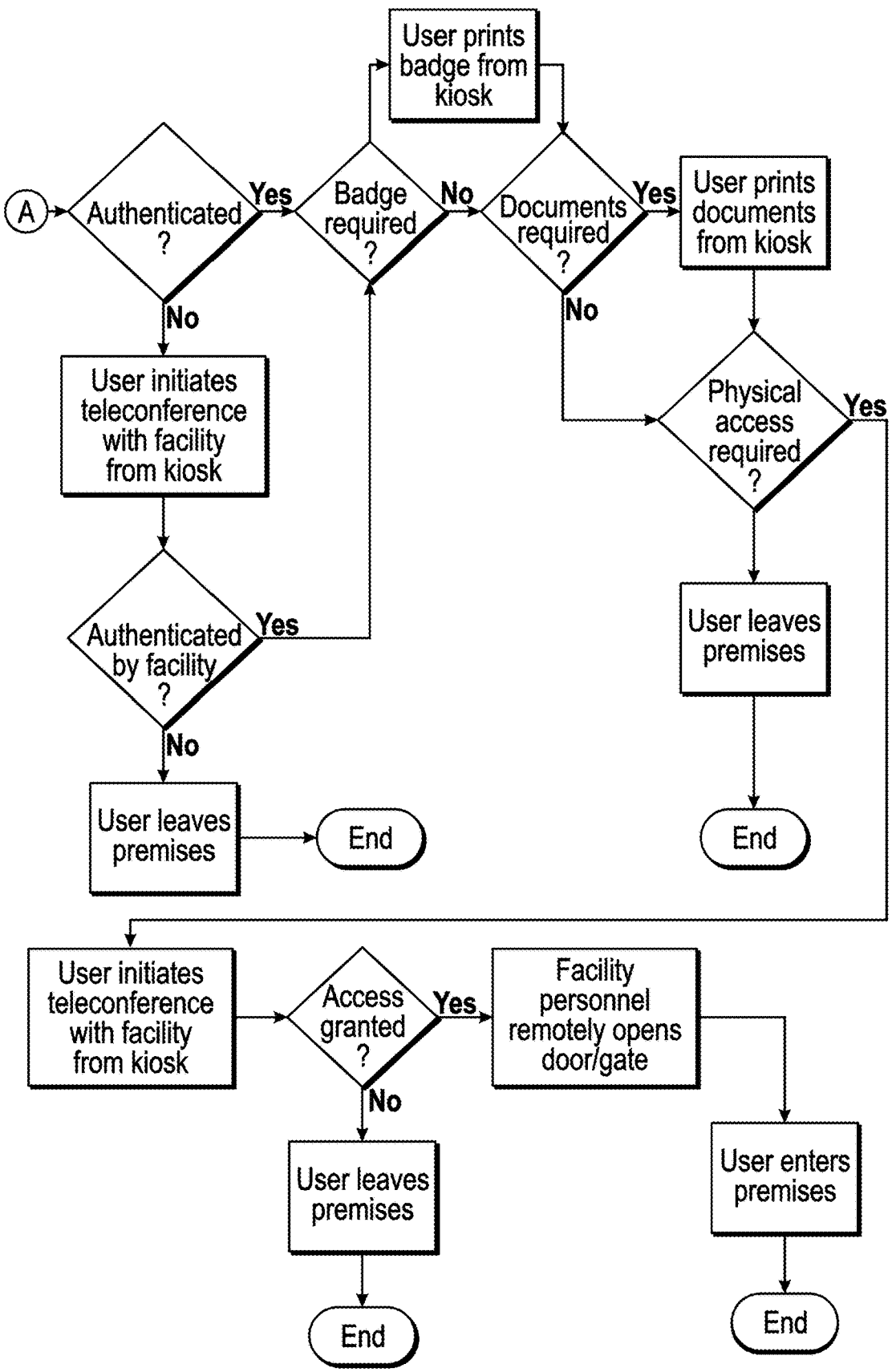

FIGS. 16A and 16B are flow charts showing an automated freight delivery/pick-up system using either of Model I and Model II user apparatuses (11, 12). The system described in FIGS. 16A and 16B may be implemented using the apparatuses, systems and methods described herein, including various embodiments thereof.

The system using the Model I or Model II user apparatuses (11, 12) includes the following steps. A driver/user arrives at a location of a Model I or Model II user apparatus (11, 12) for check-in. If the user apparatus is a Model I user apparatus (11), the driver/user attempts to authenticate his/her identification information with his/her driver's license and/or other similar identification via the card reader (magnetic stripe) (37) or barcode scanner (barcode) (38). If the user apparatus is a Model II user apparatus (12), the driver/user attempts authentication with his/her TWIC card via the TWIC card reader (fingerprint and chip on card) (100). The system then authenticates the driver/user and his/her trucking company based on the driver's identifying information and determines whether the user/driver is a valid company driver. In some embodiments, DOT reader located on the apparatuses (11, 12) or in a separate location from apparatuses (11, 12) may obtain and use a DOT number on the driver's vehicle to verify the driver's identifying information. If not valid, the driver/user initiates a call with a facility using the apparatus (11, 12). The call may be a teleconference or multimedia call. The facility then makes an additional determination as to whether the driver/user's information can be authenticated. If not, the driver/user leaves the premises.

If the driver/user's information can be authenticated, or if the user/driver was initially determined to be a valid driver, the user/driver may print a badge and/or any other documents, including shipping documents, using the user apparatus (11, 12). User/driver may print a badge using the badge printer (246) on the apparatus (11, 12). User/driver may also print additional documents using the 8½ by 11 printer (247) on the apparatus (11, 12). If user/driver does not need a badge and/or additional documents, user/driver may leave the premises. If the user/driver requires physical access into the facility, the user/driver initiates a call with the facility using the apparatus (11, 12). The call may be a teleconference or multimedia call. If access is not granted, user/driver leaves the premises. If access is granted, facility personnel remotely (or physically) open doors/gates to the facility, and user/driver enters the facility.

While embodiments of the present invention are described with regard to freight delivery and pickup, embodiments may also be implemented in various other applications, including independent identity verification of drivers, individuals, card members of various organizations, etc, through kiosk systems, DOT readers and/or related software and/or systems as described herein.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted.

What is claimed is:

1. A freight delivery/pick-up system comprising:
    a plurality of sensors provided at each of a respective plurality of freight loading/unloading docks at a freight loading/unloading facility, each sensor configured to detect a presence or absence of a vehicle at the respective loading/unloading dock;
    a user apparatus fixed at a building or stationary kiosk that is located remotely from the loading/unloading facility comprising:
        a user interface configured to communicate with a driver of a freight delivery/pick-up vehicle using a minimized interface configured to have capabilities related to driver check-in; and
        one or more of a camera and a biometric scanner that are configured to automatically receive driver and/or vehicle information;
        wherein the user apparatus is configured to automatically perform driver and/or vehicle authorization based on the received driver and/or vehicle information; and
    an administrator apparatus configured to automatically coordinate arrival of a plurality of vehicles at the freight loading/unloading facility to remove or mitigate bottlenecks associated with vehicles awaiting an opportunity to load or unload cargo by performing operations including:
        receiving signals from one or more of the plurality of sensors at the freight loading/unloading facility;
        automatically determining loading/unloading dock availability based on the received sensor signals wherein the sensor signals indicate the presence or absence of vehicles at the freight loading/unloading docks;
        sending a message via the user interface instructing the driver to go to a freight loading/unloading dock when a loading/unloading dock is available; and
        sending a message via the user interface instructing the driver to go to a waiting location until a freight loading/unloading dock is available when no loading/unloading dock is available;
    wherein the user apparatus is configured for direct communication with both the facility and the administrator apparatus via an internet interface.

2. The system of claim 1, wherein the user apparatus obtains from the driver at least one of a check-in time, a pick-up/drop-off time, authorization information, driver identifying information, truck or trailer identifying information, and scale in/weight information.

3. The system of claim 1, wherein the administrator apparatus relays to the user apparatus at least one of an assigned loading dock, a loading dock current usage graphic, a pick-up/drop-off time, and an authorized driver release.

4. The system of claim 1, further comprising a logistics support facility in communication with at least one of the administrator apparatus, user apparatus and facility.

5. The system of claim 1, further comprising a scale system that is in communication with at least one of the administrator apparatus, user apparatus and facility.

6. The system of claim 1, wherein each of the user apparatus and the administrator apparatus are in communication with camera systems.

7. The system of claim 1, wherein the user apparatus verifies driver security information and authorizes the driver for delivery at the facility.

8. The system of claim 1, wherein the administrator apparatus and user apparatus are located at the same facility.

9. The system of claim 1, wherein the administrator apparatus and user apparatus are located at different facilities.

10. The system of claim 1, wherein the administrator apparatus is located at the facility.

11. The system of claim 1, further comprising a pager system in communication with the driver and the administrator apparatus.

12. The system of claim 1, wherein the user apparatus is at least one of a kiosk and a wall mounted display.

13. The system of claim 1, wherein the user apparatus includes at least one of a card reader, an optical scanner, and a Department of Transportation (DOT) reader.

14. The system of claim 1, further comprising an administrator system that interfaces with the administrator apparatus, the user apparatus, and the facility, and coordinates the arrival of the vehicle at the facility.

15. The system of claim 1, further comprising a Department of Transportation (DOT) reader configured to obtain a machine readable Department of Transportation (DOT) number from an image on the vehicle and also configured to obtain identifying information of the driver based on the DOT number.

16. A freight delivery/pick-up apparatus comprising:
a plurality of sensors provided at each of a respective plurality of freight loading/unloading docks at a freight loading/unloading facility, each sensor configured to detect a presence or absence of a vehicle at the respective loading/unloading dock;
a user system fixed at a building or stationary kiosk that is located remotely from the loading/unloading facility comprising:
a user interface configured to communicate with a driver of a freight delivery/pick-up vehicle and to automatically gather information regarding the driver and/or a delivery schedule; and
one or more input devices that are configured to automatically receive driver and/or vehicle information, wherein the user system is configured to automatically perform driver and/or vehicle authentication based on the received driver and/or vehicle information; and
an administrator apparatus configured to automatically coordinate arrival of a plurality of vehicles at the freight loading/unloading facility to remove or mitigate bottlenecks associated with vehicles awaiting an opportunity to load or unload cargo by performing operations including:
receiving signals from one or more of the plurality of sensors at the freight loading/unloading facility;
automatically determining loading/unloading dock availability based on the received sensor signals wherein the sensor signals indicate the presence or absence of vehicles at the loading/unloading docks;
sending a message via the user interface instructing the driver to go to a loading/unloading dock when a loading/unloading dock is available; and
sending a message via the user interface instructing the driver to go to a waiting location until a loading/unloading dock is available when no loading/unloading dock is available,
wherein the user system is configured for direct communication with both the facility and the administrator apparatus via an internet interface.

17. The apparatus of claim 16, wherein the user system obtains from the driver at least one of a check-in time, a pick-up/drop-off time, authorization information, driver identifying information, truck or trailer identifying information, and scale in/weight information.

18. The apparatus of claim 16, wherein the administrator apparatus relays to the user system at least one of an assigned loading dock, a loading dock current usage graphic, a pick-up/drop-off time, and an authorized driver release.

19. The apparatus of claim 16, further comprising a pager system, the pager system including a pager in communication with the administrator apparatus.

20. The apparatus of claim 16, further comprising a camera system in communication with the administrator apparatus.

21. The apparatus of claim 16, further comprising at least one of an optical scanner and a Department of Transportation (DOT) reader.

22. The apparatus of claim 16, further comprising a card reader configured to identify the driver of the vehicle.

23. The apparatus of claim 16, wherein the user system verifies driver security information and authorizes the driver for delivery at the facility.

24. The apparatus of claim 22, wherein the card reader is a magnetic stripe reader.

25. The apparatus of claim 22, wherein the card reader is a Transportation Worker Identification Credential (TWIC) card reader.

26. The apparatus of claim 16, further comprising a Voice over Internet Protocol (VoIP) intercom system configured for the delivery of audio and multimedia sessions over Internet Protocol (IP) networks.

27. The apparatus of claim 16, further comprising a printer located within the apparatus, the printer configured to print freight delivery documents.

28. The apparatus of claim 27, wherein the printer is at least one of a badge printer and a printer configured to print on 8½"×11" paper.

29. The apparatus of claim 16, further comprising a barcode scanner, the barcode scanner configured to read one-dimensional (1D) or two-dimensional (2D) barcodes on documents containing identifying information.

30. A processor-implemented method for management of freight pick-up and delivery, comprising:
receiving, by a processor circuit of a user apparatus fixed at a building or stationary kiosk that is located remotely from a freight loading/unloading facility, driver information;
automatically performing, by the user apparatus, driver and/or vehicle authentication;
automatically coordinating, by an administrator apparatus, arrival of a plurality of vehicles at the freight loading/unloading facility to remove or mitigate bottlenecks associated with vehicles awaiting an opportunity to load or unload cargo by performing operations including:
receiving signals from one or more sensors at the loading/unloading facility, wherein the one or more sensors are provided at respective loading/unloading docks at the loading/unloading facility, each sensor configured to detect a presence or absence of a vehicle at the respective loading/unloading dock;
automatically determining loading/unloading dock availability based on the received sensor signals;
sending a message to the user apparatus instructing the driver to go to a loading/unloading dock when a loading/unloading dock is available; and
sending a message to the user apparatus instructing the driver to go to a waiting location until a loading/unloading dock is available when no loading/unloading dock is available.

* * * * *